(12) United States Patent
Brown

(10) Patent No.: US 7,329,188 B2
(45) Date of Patent: Feb. 12, 2008

(54) CONTEXTUALLY ACCURATE DIALOGUE MODELING IN AN ONLINE ENVIRONMENT

(76) Inventor: Geoffrey Parker Brown, 18545 Azure Rd., Deephaven, MN (US) 55391

( * ) Notice: Subject to any disclaimer, the term of this patent is extended or adjusted under 35 U.S.C. 154(b) by 318 days.

(21) Appl. No.: 10/696,083

(22) Filed: Oct. 29, 2003

(65) Prior Publication Data

US 2004/0147324 A1    Jul. 29, 2004

Related U.S. Application Data

(63) Continuation of application No. 09/790,157, filed on Feb. 21, 2001, now abandoned.

(51) Int. Cl.
*A63F 13/00* (2006.01)
(52) U.S. Cl. .......... 463/42; 345/474
(58) Field of Classification Search .......... 463/40, 463/42, 31
See application file for complete search history.

(56) References Cited

U.S. PATENT DOCUMENTS

| | | | |
|---|---|---|---|
| 5,261,041 A | 11/1993 | Susman | |
| 5,347,306 A | 9/1994 | Nitta | |
| 5,358,259 A * | 10/1994 | Best | 463/31 |
| 5,577,185 A | 11/1996 | Tunnell et al. | |
| 5,604,855 A | 2/1997 | Crawford | |
| 5,746,602 A * | 5/1998 | Kikinis | 434/169 |
| 5,828,843 A * | 10/1998 | Grimm et al. | 709/228 |
| 5,964,660 A * | 10/1999 | James et al. | 463/1 |
| 5,987,415 A * | 11/1999 | Breese et al. | 704/270 |
| 6,331,861 B1 | 12/2001 | Gever et al. | |

OTHER PUBLICATIONS

Love@AOL http://score.love.aol.com/flirtscore/flirt/index.html, Dec. 12, 2001.
Multipath http://multipathmovies.com, Apr. 26, 2003.
"Club Mode" http://home.achilles.net/~jgreen/clubmode.html, May 22, 2001.
Sissyfight http://www.sissyfight.com, Mar. 9, 2001.
Purple Moon http://www.service.mattel.com—keyword "Adventures", Oct. 21, 2000.
Zork http://gamespot.com/gamespot/filters/products/0,11114,199405,00.html, May 22, 2001.

(Continued)

*Primary Examiner*—Ronald Laneau
*Assistant Examiner*—Tramar Harper
(74) *Attorney, Agent, or Firm*—Kent Sieffert

(57) ABSTRACT

An interactive gaming system is described in which characters are generated and controlled to model human behavior in an accurate manner. The behaviors of the characters are contextually accurate because the behaviors adapt to accurately reflect the attitudes of the characters toward the user. A database stores relationship data representing the attitudes of the characters. A gaming engine executing on a computer is coupled to the database and receives input representing the user's interaction with the character and updates the relationship data. The gaming engine generates media for display to the user based on the relationship data. The media may include text-based dialogue, digital photographs of the character, video, audio and the like. The database stores data defining one or more behavior patterns by which the gaming engine dynamically generates the gaming environment and controls the character so as to model human nature.

9 Claims, 22 Drawing Sheets

OTHER PUBLICATIONS

EverQuest http://everquest.station.sony.com/main/info.jsp, Mar. 31, 2001.
Wilson Learning http://www.wilsonlearning.com/sales_solutions.asp, Sep. 24, 2002.
Dialogue Coaching, Inc. http://www.dialoguecoaching.com, Sep. 24, 2002.
"The Sims" http://thesims.ea.com/us, Apr. 5, 2001.
"Concept Generator" www.martinwilliams.com, May 22, 2001.
Ron Dulin, "Black and White," http://www.gamespot.com/features/bandw/index.html, Dec. 30, 1998, pp. 1-10.
"Nuriko's Princess maker Nexus," http://princessmaker.maison-otaku.net/, Apr. 9, 2001.

* cited by examiner

CONTEXTUALLY ACCURATE DIALOGUE MODELING IN AN ONLINE ENVIRONMENT

This application is a continuation of U.S. patent application Ser. No. 09/790,157, entitled "BEHAVIOR MODELING IN A GAMING ENVIRONMENT WITH CONTEXTUAL ACCURACY," filed Feb. 21, 2001 now abandoned, the entire content being incorporated herein by reference.

TECHNICAL FIELD

The invention relates to computer software and, more particularly, to techniques for modelling human behavior with contextual accuracy in a environment.

BACKGROUND

The computer gaming industry has seen tremendous growth and now includes a wide variety of platforms including hand-held games, software games executing on a desktop computer, dedicated gaming machines such as Nintendo and the Sony PlayStation, and online games provided over computer networks such as the World Wide Web (WWW). The games range from simply action-oriented games designed to test the user's reflexes to interactive, role-playing games where the user interacts with characters in a two-dimensional or three-dimensional gaming environment.

With the migration of computer games to the WWW, more and more people are participating in interactive games in which players interact with each other or with a number of predefined characters. Some games may even have pre-defined modular stories that can be reused to control the settings for the game.

SUMMARY

In general, the invention provides an interactive gaming environment in which fictional characters are generated and controlled to accurately model human behavior. The behaviors of the characters adapt to accurately reflect the characters' behavioral attitude toward individual users (players) and, therefore, are contextually accurate as the user interacts with the various characters. In this manner, the invention provides realistic characters.

Relationship skill variables are maintained for the various characters of the gaming environment to track how the users treat the characters and how the characters perceive the players. The relationship skill variables influence the gaming environment and how the characters treat the users in future encounters. For example, if a user is belligerent or unfriendly toward a character, the character may treat the user badly in the future. If the user is helpful to the character, the character may be helpful later.

In one embodiment, the invention is directed to a system in which a database stores relationship data representing the attitude of a character toward a user. A gaming engine executing on a computer coupled to the database receives input representing interaction of the user with the character and updates the relationship data. The gaming engine generates media for display to the user based on the relationship data. The media may include text-based dialogue, digital photographs of the character, video, audio and the like. The database stores data defining one or more behavior patterns by which the gaming engine controls the character and models human nature. The gaming engine selects one of the behavior patterns based on the relationship data.

In another embodiment, the invention is directed to a method in which input is received representing interaction of a user with a character within a gaming environment. Relationship data representing the attitude of a character toward the user is maintained based on the input. The character and the gaming environment are controlled based on the relationship data. For example, media, such as dialogue, graphics, audio and video can be generated based on the relationship data.

In another embodiment the invention is directed to a method in which one of a plurality of situations defined within a database is selected, each situation being associated with media. One of a plurality of characters is selected, each character being associated with media. One of a plurality of behavior patterns is selected for the character. A gaming environment is formed from the media associated with the selected situation, the media associated with the selected character and the selected behavior pattern. The gaming environment is then presented to the user.

In another embodiment, the invention is directed to a computer-readable medium having instructions for causing a programmable processor to receive input representing a user's interaction with a character within a gaming environment and maintain relationship data based on the input. The relationship data represents the attitude of the character toward the user.

In yet another embodiment, the invention is directed to a computer-readable medium having a data structure stored thereon comprising a set of data fields to store behavior patterns for a character of an online game and a set of data fields to store relationship data for the character, where the relationship data represents the character's perception of a user. The computer-readable medium may also comprise a set of data fields to store range data mapping the behavior patterns to ranges of the relationship data.

The invention provides many advantages. For example, as described above, characters behave more naturally because they follow the behavior patterns that are consistent with their perceptions of the users. Production costs for the online gaming environment may be dramatically reduced because any behavior pattern can merge with any situation to dynamically create media.

The details of one or more embodiments of the present invention are set forth in the accompanying drawings and the description below. Other features, objects, and advantages of the present invention will be apparent from the description, drawings and the claims.

BRIEF DESCRIPTION OF THE DRAWINGS

FIG. 8 illustrates the user interface when the system administrator has elected to configure an existing situation.

FIG. 16 illustrates an example window presented by the user interface that displays the behavior pattern frames of the currently defined behavior patterns.

FIG. 17 illustrates an example window for creating frames (lines) for behavior patterns.

FIG. 20 illustrates an example window presented by the gaming engine by which the system administrator can view and modify the photographs of the gaming environment.

DETAILED DESCRIPTION

Figure 1:
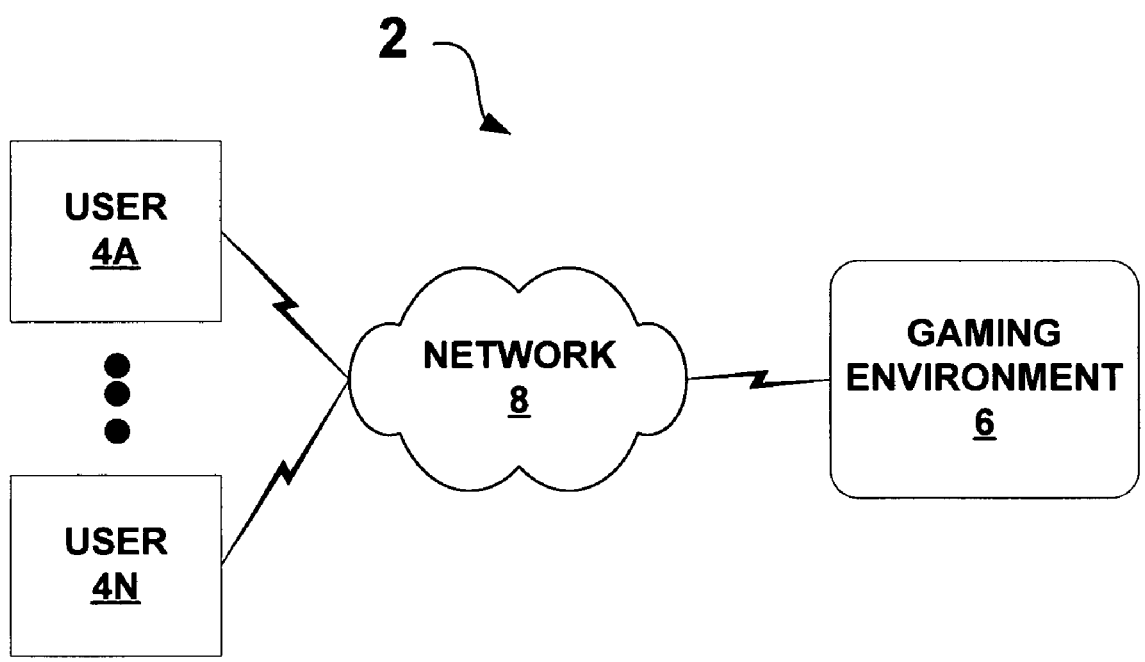
FIG. 1 is a block diagram illustrating a system for providing an interactive gaming environment according to the invention.

FIG. 1 is a block diagram illustrating a system 2 for providing an interactive gaming environment according to an embodiment of the invention. One or more users 4 access online gaming environment 6 via network 8 and interact with one or more fictional characters. As explained in detail below, online gaming environment 6 models human behavior in a natural and accurate manner to provide realistic characters. The behaviors of the characters adapt to accurately reflect their current attitudes toward users 4 based on past interaction.

Online gaming environment 6 integrates behavior patterns, situations, locations and characters to create interactive media, such as text dialogue and graphics. In this manner, gaming environment 6 reflects the characters' behavioral attitude toward the individual user and, therefore, is contextually accurate as users 4 interact with the various characters. In particular, for a given situation, the characters may exhibit different behavioral attitudes toward different users based on past interaction with the users.

Each user 4 typically interacts with a computing device suitable for accessing online gaming environment 6 via network 8. For example, a user 4 may interact with a personal computer, laptop computer, or even a personal digital assistant (PDA) such as a Palm™ organizer from Palm Inc. of Santa Clara, Calif. The communication device executes communication software, typically a web browser such as Internet Explorer™ from Microsoft Corporation of Redmond, Wash., in order to communicate with gaming environment 8. Network 8 represents any communication link suitable for communicating digital data, such as a wide-area network, local area network, or a global computer network like the World Wide Web.

Figure 2:
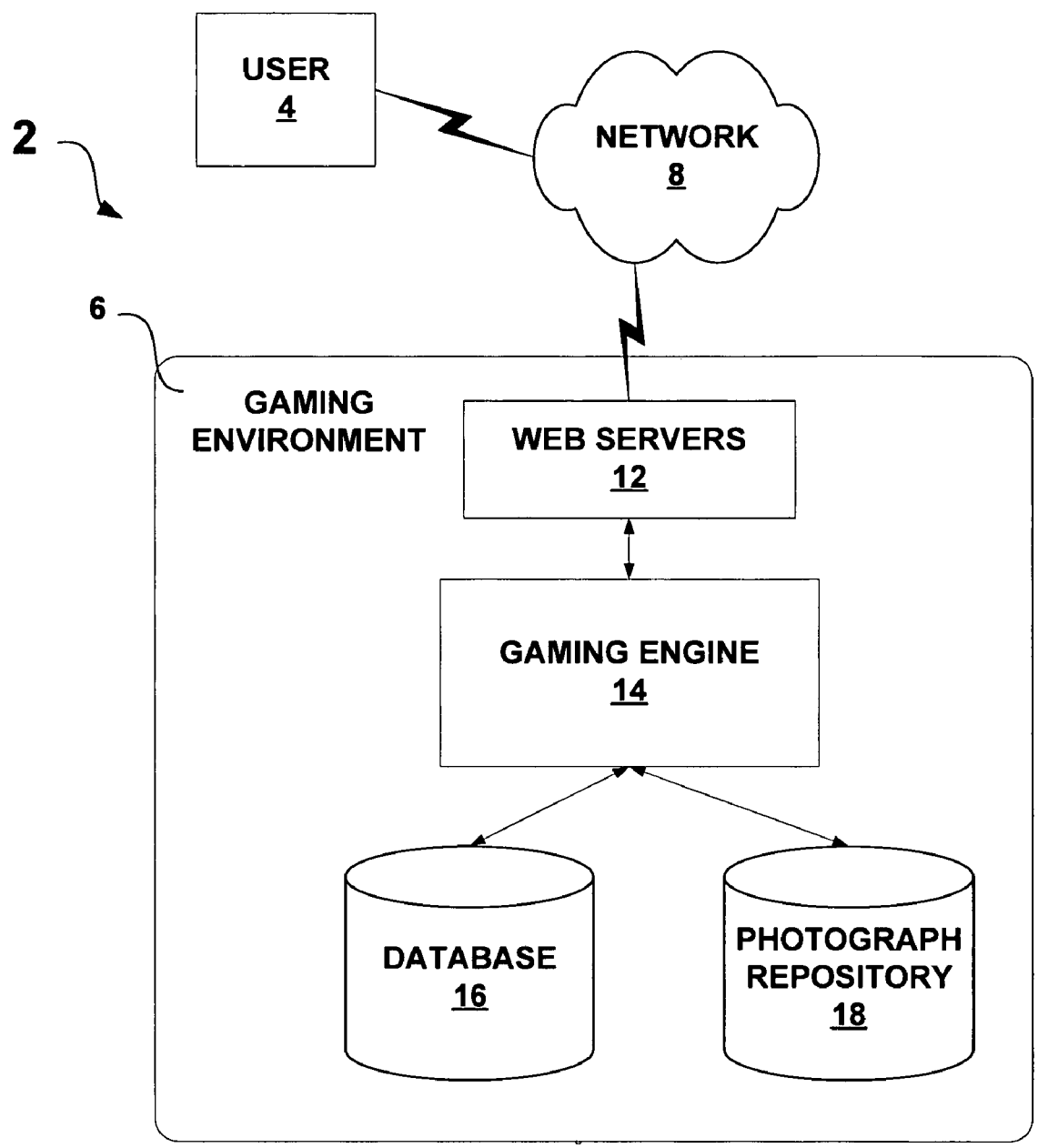
FIG. 2 is a block diagram illustrating the system in further detail.

FIG. 2 is a block diagram illustrating gaming environment 6 in further detail. Web servers 12 provide an interface for communicating with users 4 via network 8. In one configuration, web servers 12 execute web server software, such as Internet Information Server™ from Microsoft Corporation, of Redmond, Wash. In another configuration, web servers 26 execute Websphere Application Server™ on a Domino™ Server from International Business Machines Corporation (IBM) of Armonk, N.Y. As such, web servers 12 provide an environment for interacting with users 4 according to gaming engine 14, which may comprise a variety of software modules including Active Server Pages, Java scripts, Java Applets, Lotus scripts, web pages written in hypertext markup language (HTML) or dynamic HTML, Active X modules, Shockwave™, Flash™ and other suitable software modules.

Gaming engine 14 generates the gaming environment including assembling content, such as text, video, audio and graphic elements. Gaming engine 14 accesses database 16 to store and retrieve information describing the possible characters, locations, situations and character behavior patterns. Database 16 can be implemented in many forms including a relational database, such as Microsoft Access or SQL Server from Microsoft Corporation, running on one or more database servers. Photograph repository 18 stores a set of photographs for each of the characters and locations of gaming environment 6 illustrating a variety of expressions and reactions.

Figure 3:
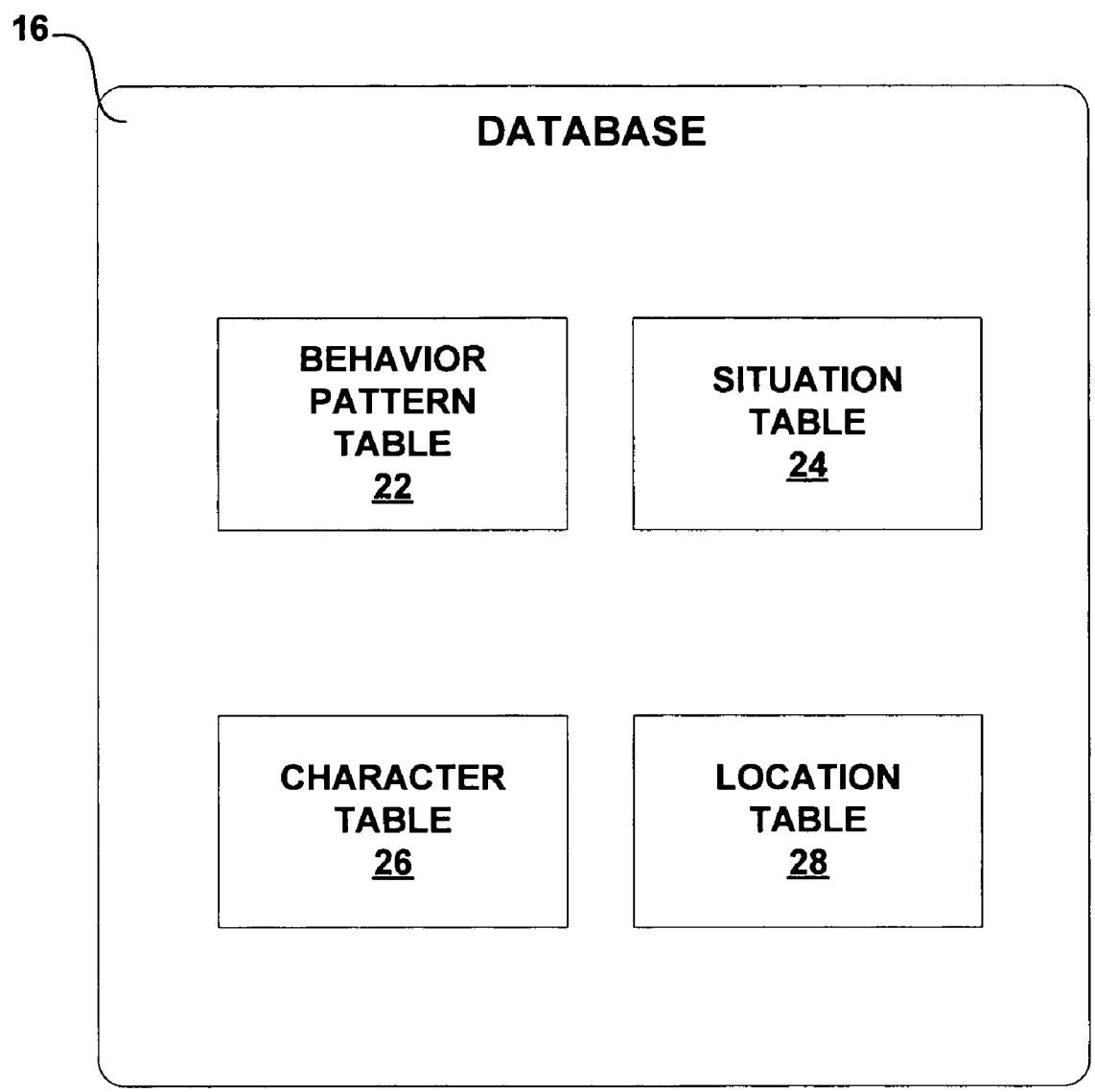
FIG. 3 illustrates an example schema for a database configured to store a variety of data for the gaming environment.

FIG. 3 illustrates an example schema for database 16 configured to store a variety of data used by gaming engine 14 to generate and control the gaming environment. Generally, gaming engine 14 maintains data in a number of tables including behavior pattern table 22, situation table 24, character table 26 and location table 28. Gaming engine 14 extracts data from the various tables of database 16 and assembles the data to form content for the game. For example, gaming engine 14 may integrate a current behavior pattern with a situation, a location and one or more characters to create interactive media, such as text dialogue and graphics, for the game. In this manner, the media can be assembled in a modular manner, taking attributes from the tables in database 16. The assembled media reflect the character's current behavioral attitude toward the user and, as explained below, is contextually accurate as the user interacts with the various characters.

Behavior pattern table 22 stores one or more behavior patterns that are modular branching scripts or patterns with finite ends. Each pattern provides a model by which the character interacts with the user according to a consistent attitude. For example, a behavior pattern may define a series of interactions between the user and character in which the character flirts with the user. A second behavior pattern may define a series of interactions in which the character criticizes the user. Other examples of behavior patterns for characters include self-serving, discussing, disclosing and repulsing.

An individual behavior pattern has a set of frames that, as described below, are linked so as to control the flow of the character's interaction with the user during a particular behavior. Each frame includes a sequence of behavior tags for selecting and incorporating media, such as text-based dialogue, from situation table 24, location table 28 and character table 26.

Notably, each behavior pattern has a limited number of frames, one or more starting frames and one or more ending frames. In this manner, behavior patterns can readily be used with a variety of different situations, characters and locations to efficiently generate dialogue without appearing to the user as redundant.

In one embodiment, each frame of a behavior pattern comprises (1) media defining a number of choices for the user; (2) a set of pointers to other destination frames within the behavior pattern, each pointer corresponding to one of the choices; (3) presentation information to be displayed when the frame is pointed to by another frame; and (4) a set of modification values for adjusting the current character's attitudes toward the user when the user causes the character to arrive at the particular frame of a behavior pattern.

To display a current frame within a behavior pattern, gaming engine 14 locates the destination frames pointed to by the current frame and retrieves the corresponding presentation information. Ending frames have a frame attribute set indicating the frame is an end of a behavior pattern. Typically, the frames within a behavior pattern are written with minimal static media having most of the media pulled from the situation table 24 and character table 26.

Situation table 24 stores one or more situations that describe the context in which the user interacts with the character. In an office setting, for example, the character may be accusing the user of stealing papers from the office, giving the user a project for completion or discussing a recent hiring decision by the company.

Each situation defines a number of situation tags that can be used in the frames of the behavior patterns to identify situation-specific media. The tags can be created, modified and incorporated into behavior patterns by a system administrator or other author. Generally, a tag can be written either from the user's perspective or from the character's perspective. The following table illustrates example situation tags for generating media:

TABLE II

| | | |
|---|---|---|
| AdOneTask | CounterSmartSolutionUSER | SmartSolution |
| AdOneTaskName | CounterStupidSolution | SmartSolutionUSER |
| AdOneTaskThing | CounterStupidSolutionUSER | StationName |
| AdThreeTask | CounterUnlikelySolution | StupidSolution |
| AdThreeTaskName | CounterUnlikelySolutionUSER | StupidSolutionUSER |
| AdThreeTaskThing | Excuse1 | SubTask1 |
| AdTwoTask | Excuse1USER | SubTask1USER |
| AdTwoTaskName | Excuse2 | SubTask1Reason |
| AdTwoTaskThing | Excuse2USER | SubTask1ReasonUSER |
| ConsequencesIfDone | Excuse2USERR | SubTask2 |
| ConsequencesIfDoneUSER | Excuse3 | SubTask2USER |
| ConsequencesIfUndone | Excuse3USER | Task |
| ConsequencesIfUndoneUSER | GameClueOne | TaskName |
| CounterExcuse1USER | NeutralFact1 | TaskNameUSER |
| CounterExcuse2 | NeutralFact1USER | TaskOverseer |
| CounterExcuse2USER | NeutralFact2 | TaskOverseerUSER |
| CounterExcuse3 | NeutralFact2USER | TaskUSER |
| CounterExcuse3USER | OpeningStatusSentence | TaskThing |
| CounterExecuse1 | PossibleSolution1 | TaskThingUSER |
| CounterPossibleSolution1 | PossibleSolution1USER | TestType |
| CounterPossibleSolution1USER | PossibleSolution2 | UnlikelySolution |
| CounterPossibleSolution2 | PossibleSolution2USER | UnlikelySolutionUSER |
| CounterPossibleSolution2USER | ReasonForTask | Weather |
| CounterSmartSolution | ReasonForTaskUSER | WeatherUSER |

Character table 26 defines one or more characters for interacting with the user. The characters are configured to model real life in that each character has his or her own expressions and patterns of talking. These patterns and characteristics change according to the character's interaction with the user. Each record of character table 26 stores a set of relationship skill variables that reflect how a particular character perceives the user's actions, such as the user's responses to choices. Gaming engine 14 updates the relationship data of the characters as the user proceeds through the game and interacts with the characters. As the user moves through various locations, situations and behavior patterns, the characters act and react according to previous interactions with the user, i.e., the characters' behaviors reflect the changes in the relationship data.

In one embodiment, each character record stores the relationship data in five relationship skill variables representing the character's opinion of the user's trustworthiness, likeability, intelligence, power and attraction. Other possible relationship skill variables include perceptiveness, clarity and knowledgeability. However, it may be preferable to limit the number of variables to save production costs, storage space and processing time, and so as not to dilute the character's reaction to the user. Each character's relationship skill variables are valid over a predefined range, such as −50 to +50, and are initially preset to reflect any predispositions of the character. Each character record may also define a set of sensitivity values representing the character's sensitivity for each skill variable.

Gaming engine 14 selects the behavior patterns for the various characters based on the present value of the relationship skill variables for the current character. Each behavior pattern is mapped to a predefined range of the skill variables. For example, the system administrator may define a "disclose" behavior pattern, in which the character discloses secrets to the user, when likeability is greater than +30, trust is greater than +45, intelligence is greater than +15, power is greater than +10 and attractiveness is greater than +40.

In addition to the skill relationship variables, each character record stored in character table 26 corresponds to a set of photographs within photograph repository 18. For example, a character record may correspond to 50 or 100 close-up photographs of a person illustrating a wide variety of emotional expressions. The photos may be provided without a background to facilitate their use in different locations. Furthermore, each photo is mapped to a range of one of the skill variables. Based on the current value of a character's skill variables, gaming engine 14 selects a photograph and overlays the selected photograph of the character with the photograph of the current location, discussed below, to form media for the present frame of the behavior pattern. This allows the character's expressions to readily change independently of location. Other media may also used to portray the character's expressions including video and audio.

The character records of character table 26 may further define probabilities of the characters appearing at each location. This reflects the real-life fact that people tend to hang out at certain locations. For example, a character may have a 25% likelihood of being in the kitchen but a 75% chance of being in the laboratory.

Like records of situation table 24, each record of character table 26 defines a number of tags that can be used in the frames of the behavior patterns to identify character-specific media for use in the behavior frames. The following table illustrates example character tags for generating media:

TABLE III

| | | |
|---|---|---|
| AdOneTask | CharacterName | Joke2 |
| AdOneTaskName | CharGameClueOne | Joke3 |
| AdOneTaskThing | Curse | Joke4 |
| AdThreeTask | CurseAdjective | OfficeVictory1 |
| AdThreeTaskName | CurseAdverb | Philosophy |
| AdThreeTaskThing | CurseNoun | SelfSecret1 |
| AdTwoTask | Exclamation | SelfSecret2 |
| AdTwoTaskName | HobbyNoun | StationName |
| AdTwoTaskThing | HobbySentence | TestType |
| AmusementNoun | HouseholdTask | UnpleasantAlternative |
| AmusementTask | Joke1 | WarStory |

Location table 28 stores one or more location records that define the gaming environment. Gaming engine 14 accesses location table 28 to retrieve media, such as text-graphics, audio and video, representing the current setting in which the character and the user interact. For example, each record in the location table 28 may map to one or more background photographs stored in photograph repository 18.

The user may navigate through the gaming environment in a number of ways. For example, the user may interact with gaming engine 14 to move a corresponding icon within a 2D or 3D space. Alternatively, the user may simply choose a location from a list of possible locations available in a pull-down menu.

Figure 4:
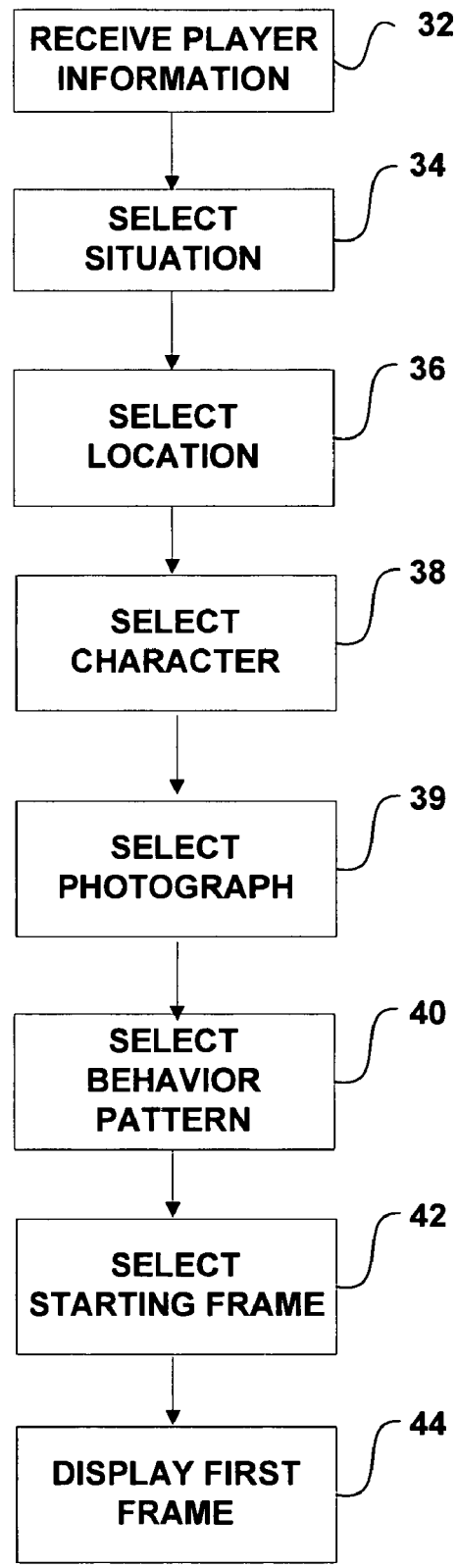
FIG. 4 is a flow diagram illustrating a typical mode of operation for a gaming engine while starting a new game.

FIG. 4 is a flow diagram illustrating a typical mode of operation for gaming engine 14 when starting a new game. First, gaming engine 14 receives information from a user 4 accessing the gaming environment 8 via network 8 (32). For example, the gaming machine 14 may receive a variety of information from the user including a name, preferences and characteristics. Next, gaming engine 14 randomly selects a situation from one of the defined situations of situation table 24 within database 16 (34). Based on the selected situation, gaming engine 14 selects a location (36). For example, not all locations are necessarily valid for all situations.

Next, gaming engine 14 accesses database 16 and identifies all valid characters based on the selected situation and location. The characters have probabilities of appearing at the various locations. Based on the characters' probabilities, gaming engine 14 selects one of the characters (38). After selecting the character, gaming engine 14 initializes the character's relationship skill variables. Each character may have a predisposition toward the user, such as a propensity to like or dislike the user, that influences how the character's skill variables should be initialized. In one embodiment, the character has a set of predefined initial settings for the character's skill variables.

After selecting the character, gaming engine 14 selects a character's photograph (39). Each character has a set of photographs that are mapped to ranges of one or more of the character's skill variables. For example, in one embodiment each character may have 50-100 photographs offering a range of different expressions. Gaming engine 14 identifies the set of valid photographs for the character based on the current value of the character's skill variables. Next, gaming engine 14 randomly selects a photograph from the identified photographs. In one embodiment, gaming engine 14 automatically selects a character's photograph based on the current value of the character's "likeability" skill variable.

After selecting the photograph, gaming engine 14 identifies the valid behavior patterns based on the current settings of the character's skill variables. For example, if the character's "likeability" setting is extremely low, i.e., the character does not like the user, the character is unlikely to enter a "flirt" behavior pattern. Next, gaming engine 14 removes any behavior patterns that are excluded based on the situation. For example, a character may not act according to a flirt behavior pattern if the selected situation is a search of the character's desk for stolen items. Gaming engine 14 then randomly selects one of the behavior patterns from the remaining set of valid behavior patterns (40).

After selecting a behavior pattern, gaming engine 14 identifies and randomly selects one of the possible starting frames within the selected behavior pattern (42). Finally, gaming engine 14 presents the selected frame to the user and begins the gaming (44).

Figure 5:
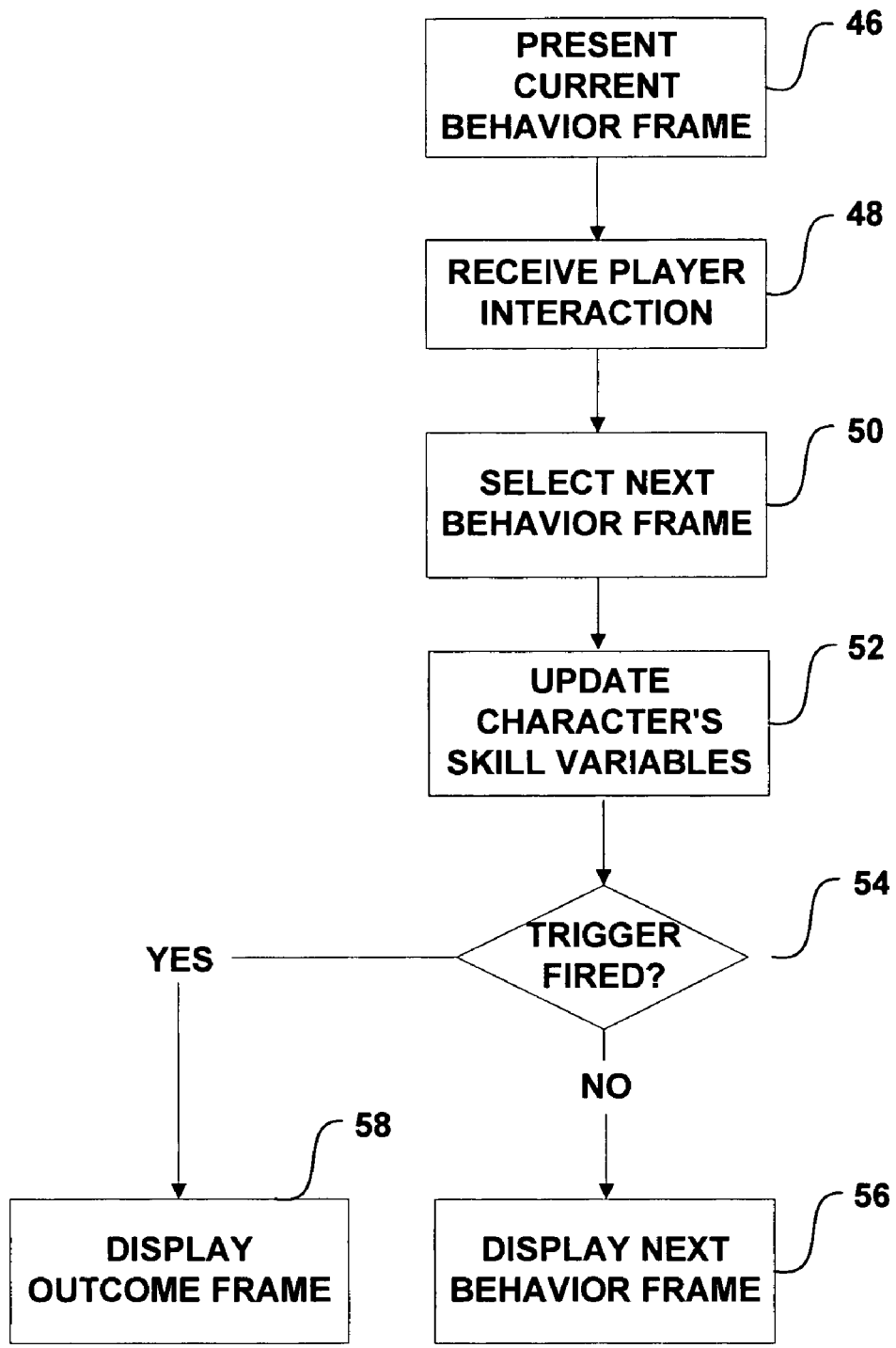
FIG. 5 is a flow diagram illustrating a typical mode of operation for the gaming engine while the user proceeds through a behavior pattern.

FIG. 5 is a flow diagram illustrating a typical mode of operation for gaming engine 14 while the character acts according to a behavior pattern. Based on the current frame within the behavior pattern, gaming engine 14 assembles dialogue and other media and presents the media to the user as described above (46). Typically, the media may elicit interaction from the user (48). For example, the media may include dialogue and a number of possible responses for selection by the user.

After gaming engine 14 receives the user's interaction, gaming engine 14 determines the next frame of the behavior pattern (50). In one embodiment, each possible response presented to the user in the current frame is mapped to a next frame within the behavior pattern. Based on the response, gaming engine 14 accesses database 16 and retrieves data for the next frame. Based on the data, gaming engine 14 updates the character's skill variables that track the character's perceptions of the user (52).

In one embodiment, each frame of a behavior pattern contains a set of modification values for adjusting corresponding skill variables when the character's behavior reaches the frame. For example, a frame may define a +2 modification value for the "likeability" skill variable. In addition, each character may have a set of sensitivity values representing the character's sensitivity for each skill variable. Upon reaching a new behavior frame, gaming engine 14 multiplies each modification value by the character's sensitivity for the corresponding skill variable. The result may be additionally multiplied by a game sensitivity in order to increase or decrease the speed of the game, thereby adjusting the playing time. Finally, gaming engine 14 adds the resultant modification values to the current corresponding skill variables. The skill variables are then checked to ensure they fall within a valid range, such as −50 to +50.

After updating the skill variables, gaming engine 14 determines whether an outcome trigger has fired, i.e., whether an outcome condition has been satisfied, based on the character's perceptions of the user (54). Gaming engine 14 determines whether the skill variables have reached any pre-defined thresholds. For example, thresholds for the behavior variables may be set that, when met, indicate the user's relationship skills have reached levels dictating that he or she should be promoted, fired, seduced, etc., by the character. In the event an outcome has been reached, gaming engine 14 jumps out of the current behavior pattern and displays an outcome page (58). If a trigger has not fired, gaming engine 14 displays the next behavior frame (56).

Figure 6:
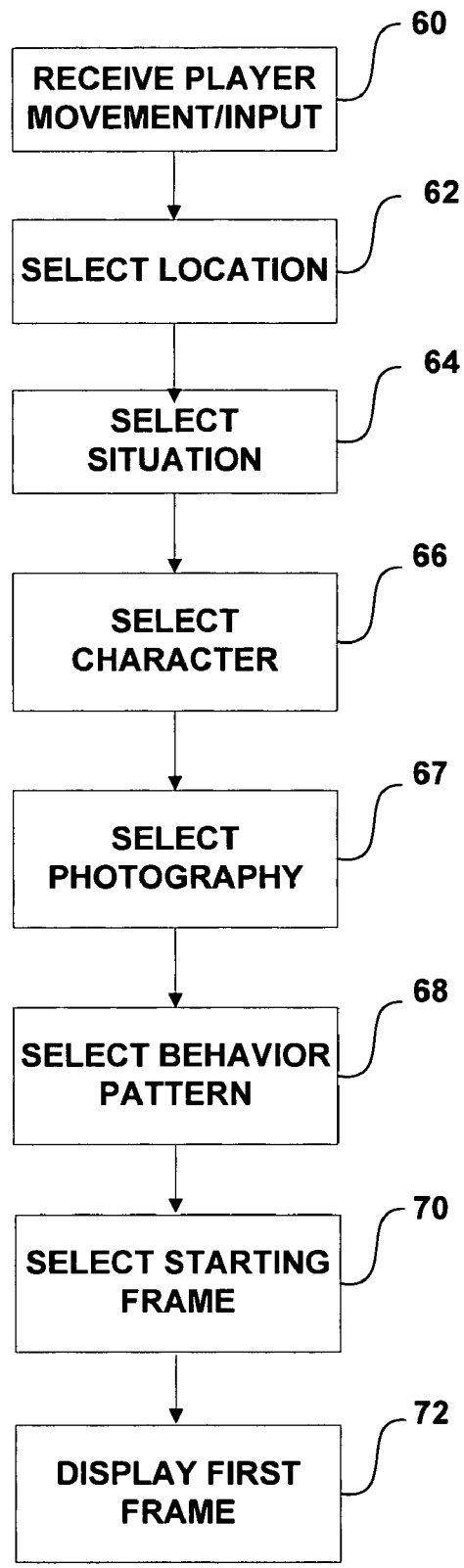
FIG. 6 is a flow diagram illustrating a typical mode of operation for the gaming engine while transitioning from one behavior pattern to another.

FIG. 6 is a flow diagram illustrating a typical mode of operation for gaming engine 14 after the user transitions from one location to another. Upon concluding a behavior pattern, the user interacts with gaming engine 14 (60). For example, the user may interact with gaming engine 14 to move a corresponding icon within a two or three-dimensional space. Alternatively, the user may simply choose a location from a list of possible locations. Based on the user's input, gaming engine 14 selects a location (62). Based on the selected location, gaming engine 14 selects a situation from a set of valid situations, and may exclude recent situations that have been selected (64).

As described above, situations define ranges for acceptable skill variables. Gaming engine identifies all valid characters having current skill variables within the acceptable ranges that are defined by the selected situation. The characters' skill variables are persistent throughout the entire gaming session, and possibly across sessions. In other words, characters remember how they feel toward the user. Gaming engine 14 may exclude some characters based on the situation and the defined acceptable ranges for skill variables. Gaming engine 14 chooses one of the valid characters based on the characters' probabilities to be at the selected location (66).

After selecting the character, gaming engine 14 identifies the set of valid photographs for the character based on the current value of the character's skill variables and selects one of the valid photographs (67). Next, gaming engine 14 identifies a set of valid behavior patterns based on the current settings of the character's skill variables and the selected situation. Gaming engine 14 then randomly selects one of the valid behavior patterns (68). After selecting a behavior pattern, gaming engine 14 identifies and randomly selects one of the possible starting frames within the selected behavior pattern (70) and presents the selected starting frame to the user and begins the game (72).

Figure 7:
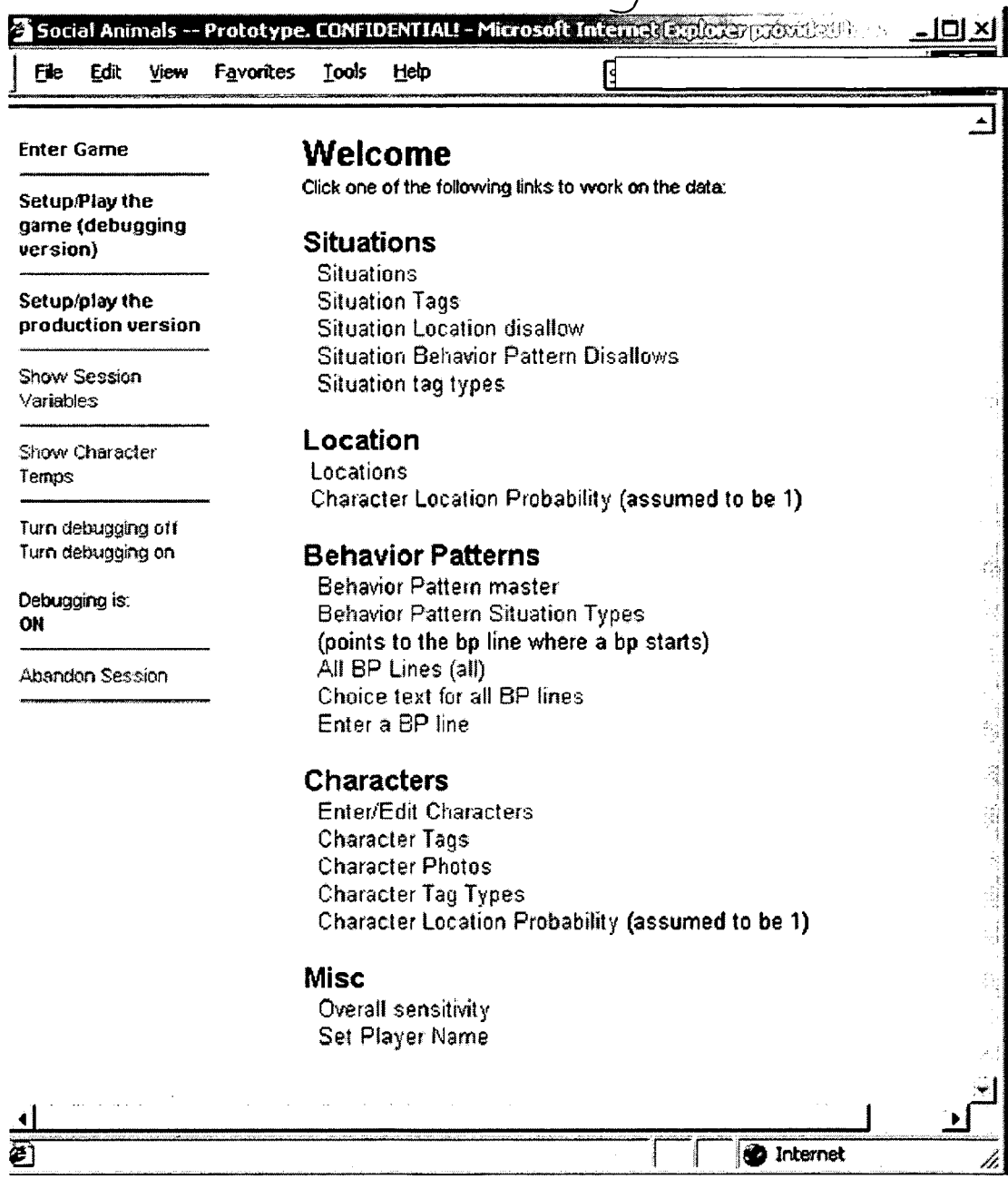
FIG. 7 illustrates an example user interface presented by a client computing device by which a system administrator controls and configures the online gaming environment.

FIG. 7 illustrates an example user interface 74 presented by a client computing device by which a system administrator controls and configures online gaming environment 6. For example, user interface 74 allows the system administrator to configure the various components of database 16, gaming engine 14 and photograph repository 18. As illustrated by user interface 74, the system administrator can configure the situation table 24, the location table 28, the behavior pattern table 22 and the character table 26 by selecting the corresponding input area within user interface 74.

Figure 8:
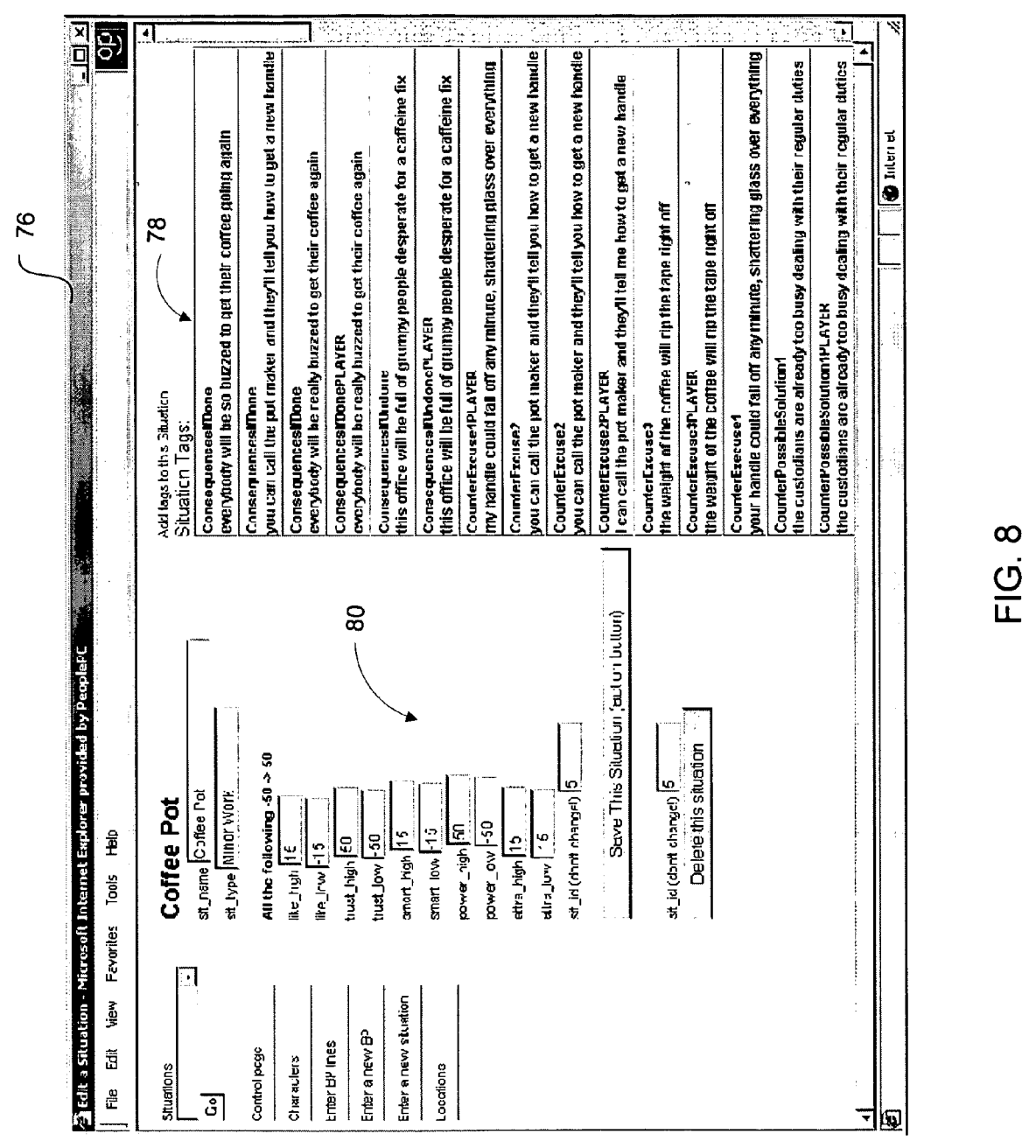

FIG. 8 illustrates user interface 74 when the system administrator has elected to configure an existing situation. Here, user interface 74 has displayed a window 76 illustrating an example situation involving interaction at the office coffee pot. By interacting with window 76, the system administrator can define one or more situation tags 78 to be displayed to the user upon interacting with gaming engine 14. For example, gaming engine 14 may select a number of the situation tags to assemble the media displayed to the user. For example, the ConsequencesIfDone situation tag maps to the corresponding dialogue "everybody will be so buzzed to get their coffee going again." In addition, the system administrator may define ranges for the relationship skill variables for which this situation is valid. More specifically, ranges 80 limit the possibilities of the coffee pot situation being selected by gaming engine 14. Here, the system administrator has defined the coffee pot situation to be valid when the likeability skills relationship variable is within a −15 to a +15 value, the trust variable is between −50 and +50, the smart variable is between +15 and −15, the power variable is between +50 and −50 and the attraction variable is between +15 and −15.

Figure 9:
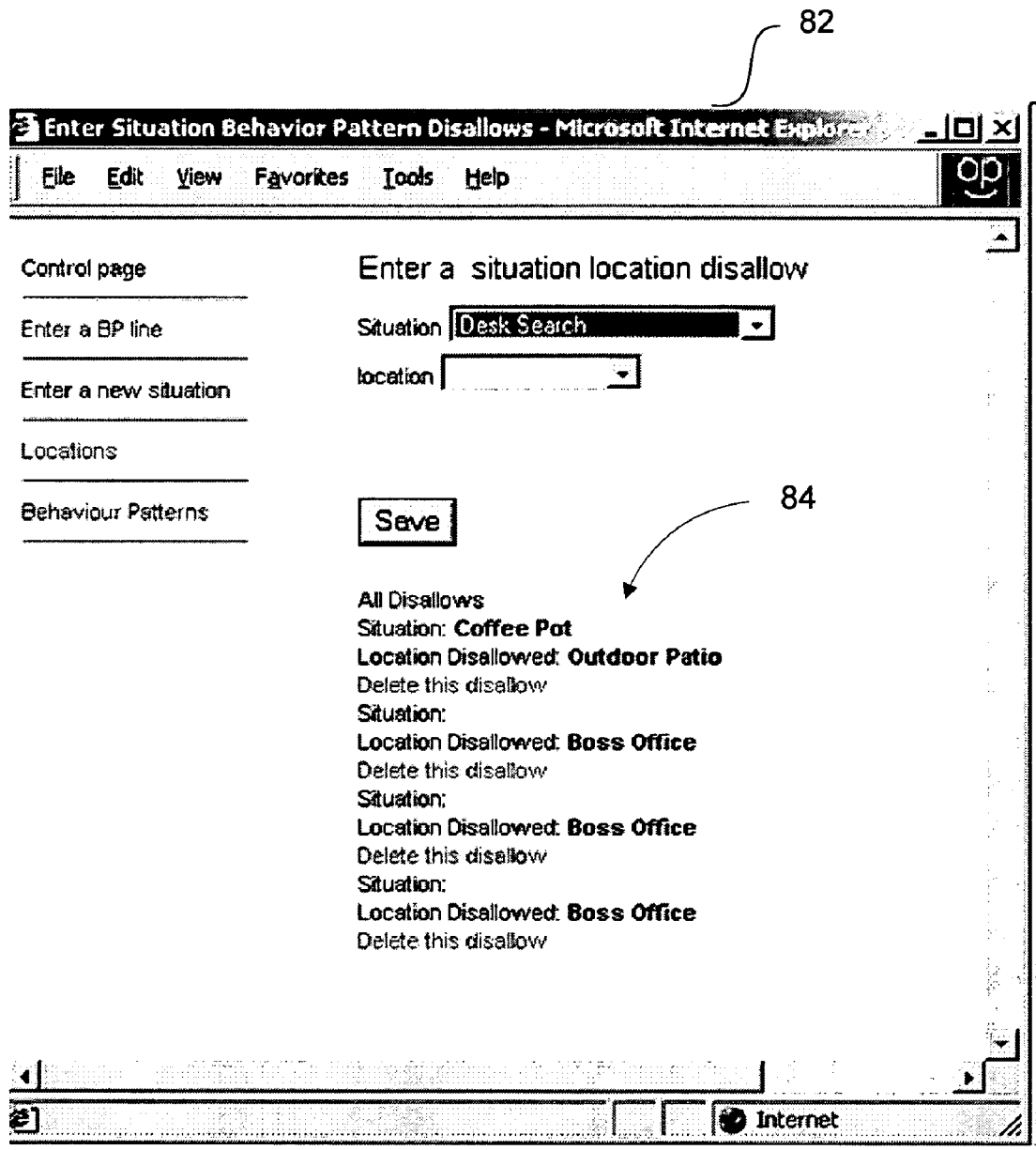
FIG. 9 illustrates a window presented by the user interface for preventing a situation from being selected.

FIG. 9 illustrates a window 82 presented by gaming engine 14 for preventing a situation being selected. More specifically, window 82 allows the system administrator to exclude certain situations based on the current location of the user within gaming environment 6. For example, a number of exclusions are displayed via list 84 including the coffee pot situation, which could be excluded from an outdoor patio location.

Figure 10:
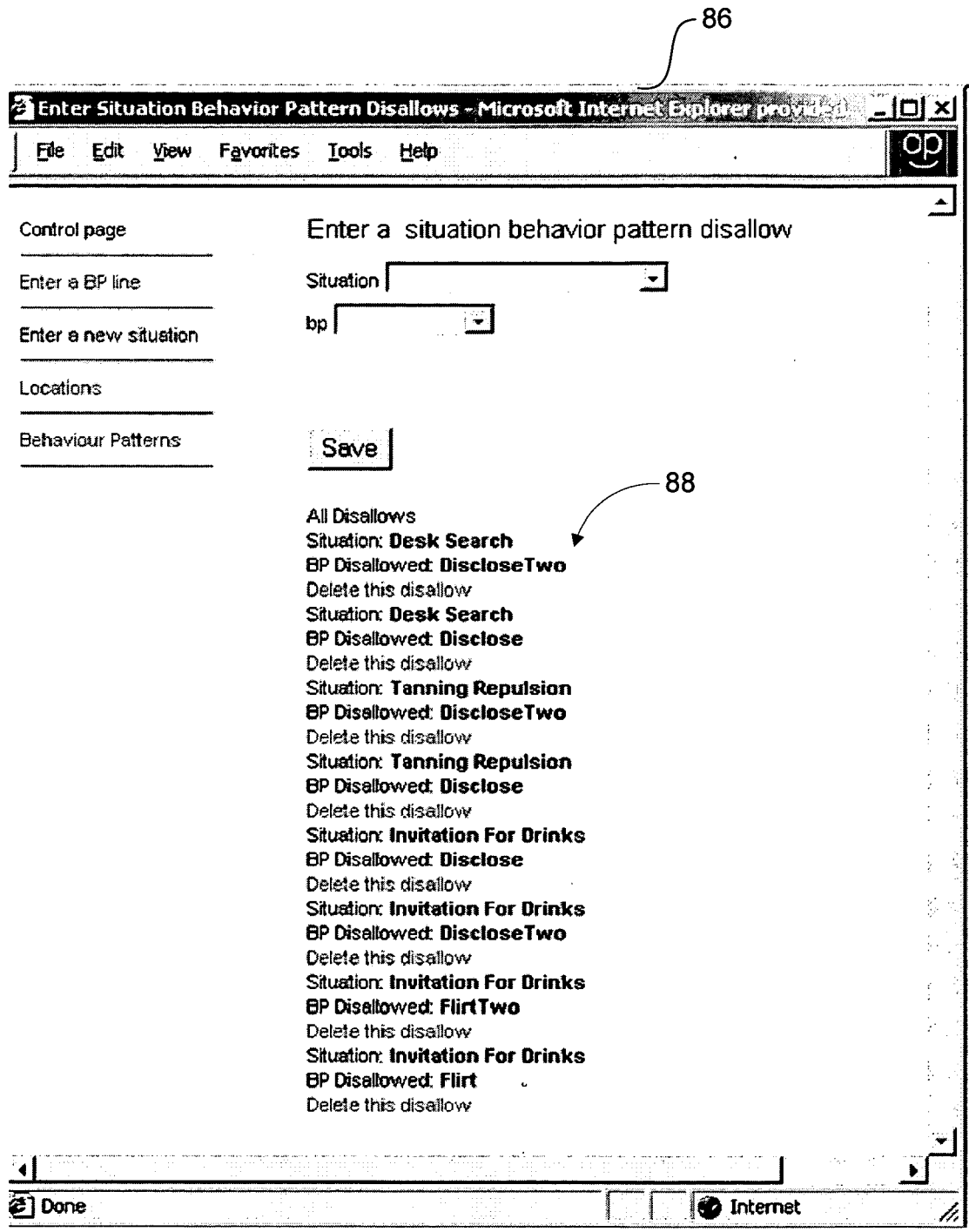
FIG. 10 illustrates an example window in which the system administrator interacts with the gaming engine to exclude behavior patterns based on situation.

FIG. 10 illustrates an example window 86 presented by the user interface for excluding behavior patterns based on situation. Window 86 displays a list 88 of a number of behavior patterns that are excluded based on situation. For example, the behavior pattern Disclose Two is excluded if the situation is Desk Search. In this case, disclosing information to a user would be inconsistent with executing a search of his desk for stolen items.

Figure 11:
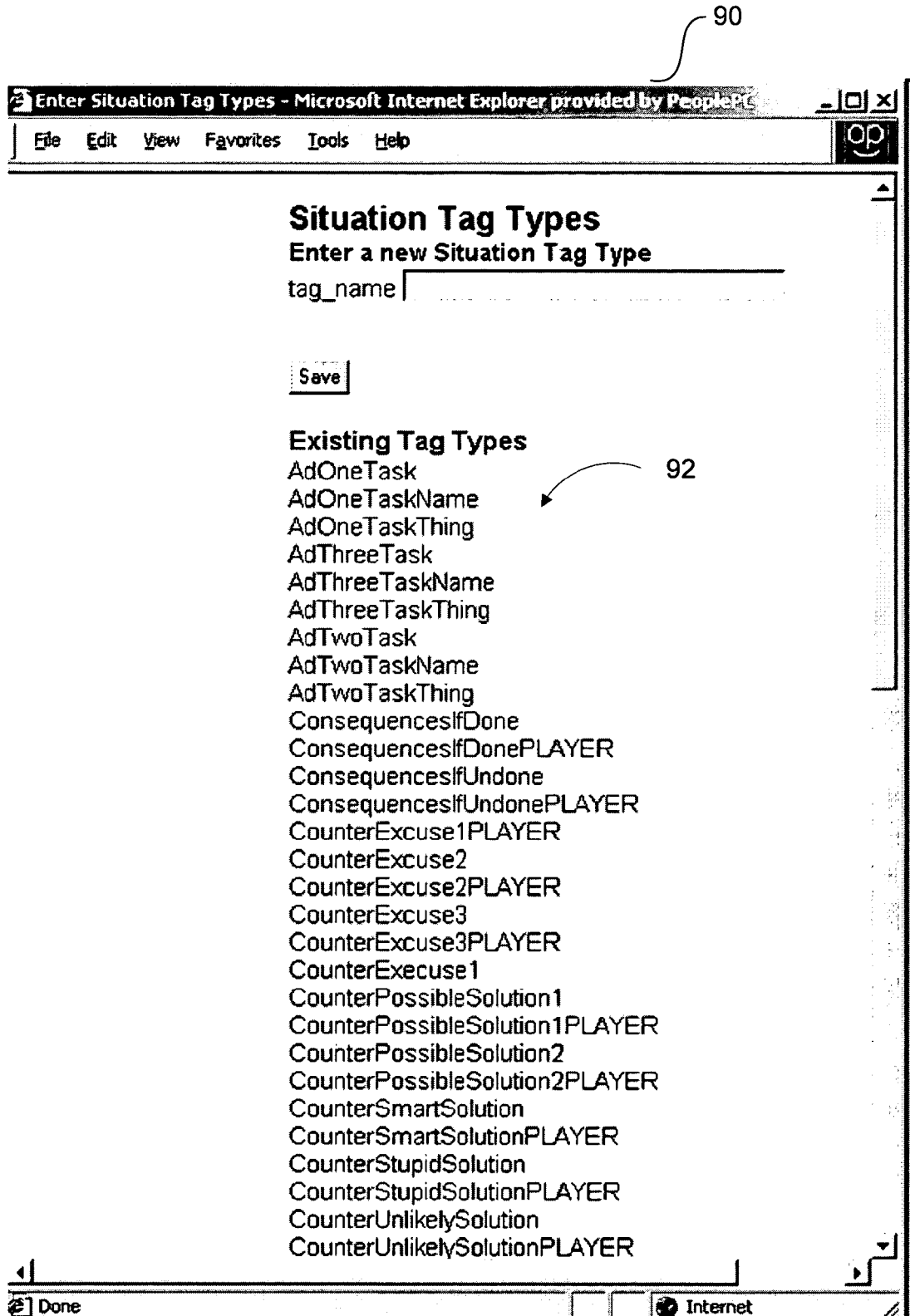
FIG. 11 illustrates an example window of the user interface presented by the gaming engine by which the system administrator can manage situation tags for assembling dialogue based on the current situation.

FIG. 11 illustrates an example window 90 presented by gaming engine 14 by which the system administrator can manage situation tags types for assembling situation-specific content. For example, window 90 includes a list 92 of currently defined situation tag types for defining situation-specific media.

Figure 12:
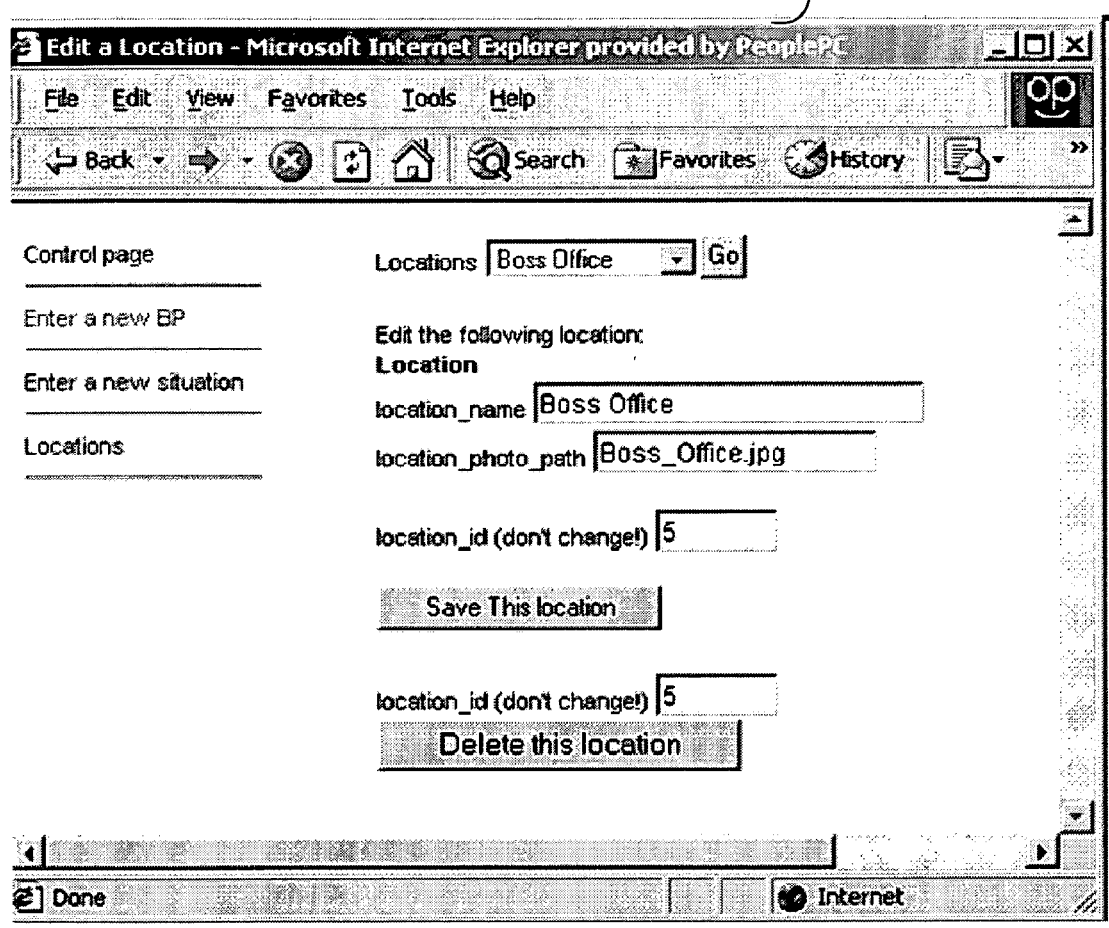
FIG. 12 illustrates an example window of the user interface by which the system administrator can define new locations and modify existing locations.

FIG. 12 illustrates an example window 94 of the user interface for defining new locations and modifying existing locations. The system administrator can define a name for the location as well as a background photograph stored within photograph repository for display when the location is selected by gaming engine 14. For example, window illustrates the system administrator defining a location entitled "Boss Office."

Figure 13:
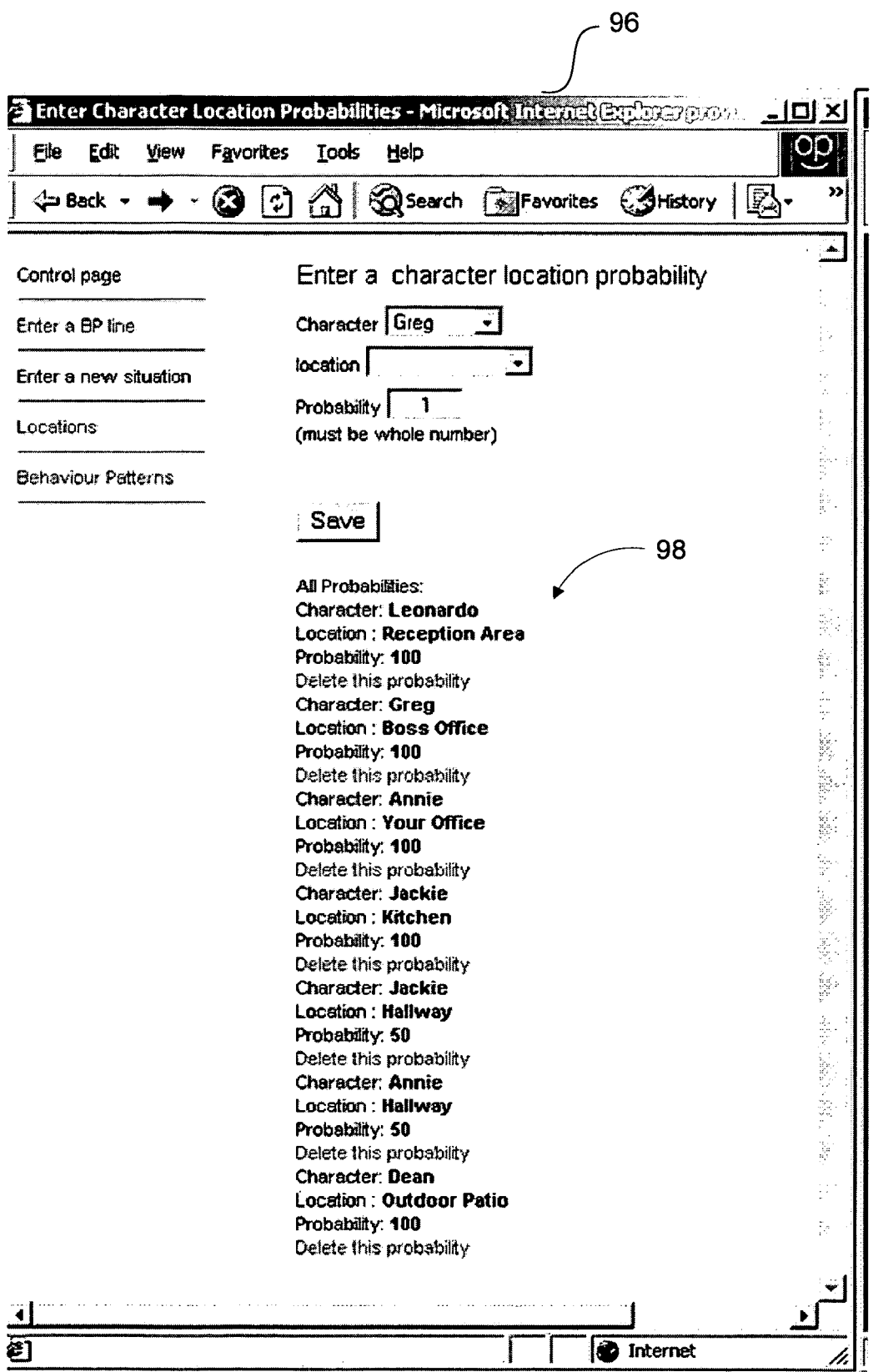
FIG. 13 illustrates a window by which the system administrator can define the probabilities that a character will appear at the various locations.

FIG. 13 illustrates a window 96 for controlling the probabilities that a character will appear at the various locations. For example, window 96 displays a list 98 of the various multipliers for controlling the likelihood of the current characters appearing in the various defined locations. A multiplier of 50, for example, means that the character is fifty times more likely to appear at the corresponding location than a character having a multiplier of one.

Figure 14:
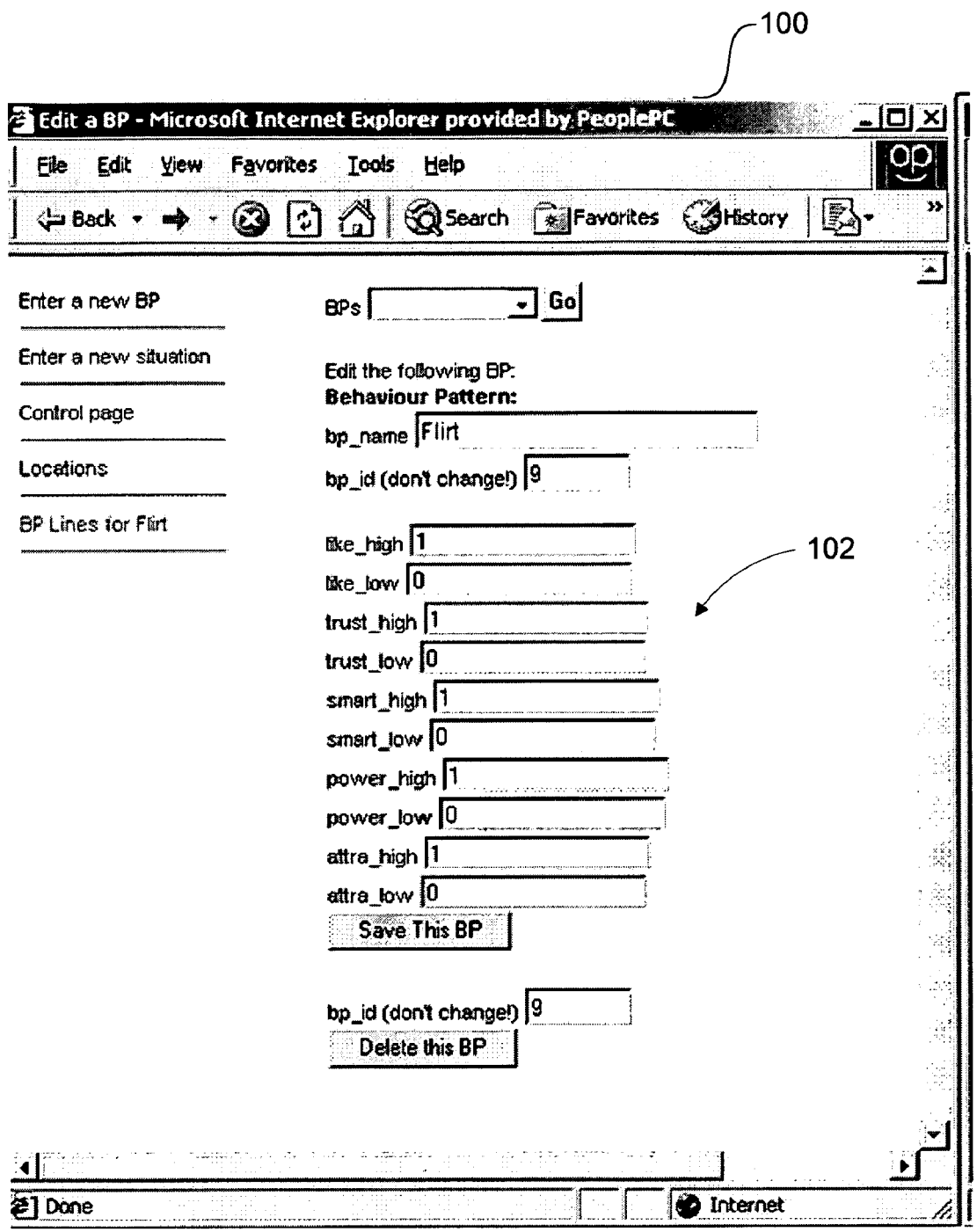
FIG. 14 illustrates an example window by which the user can define a new behavior pattern or modify existing behavior patterns.

FIG. 14 illustrates an example window 100 by which the user can define a new behavior pattern or modify existing behavior patterns. For example, window 100 illustrates a system administrator defining a Flirt behavior pattern. For each behavior pattern, the system administrator can interact with window 100 and define various ranges 102 for the skills relationship variables.

Figure 15:
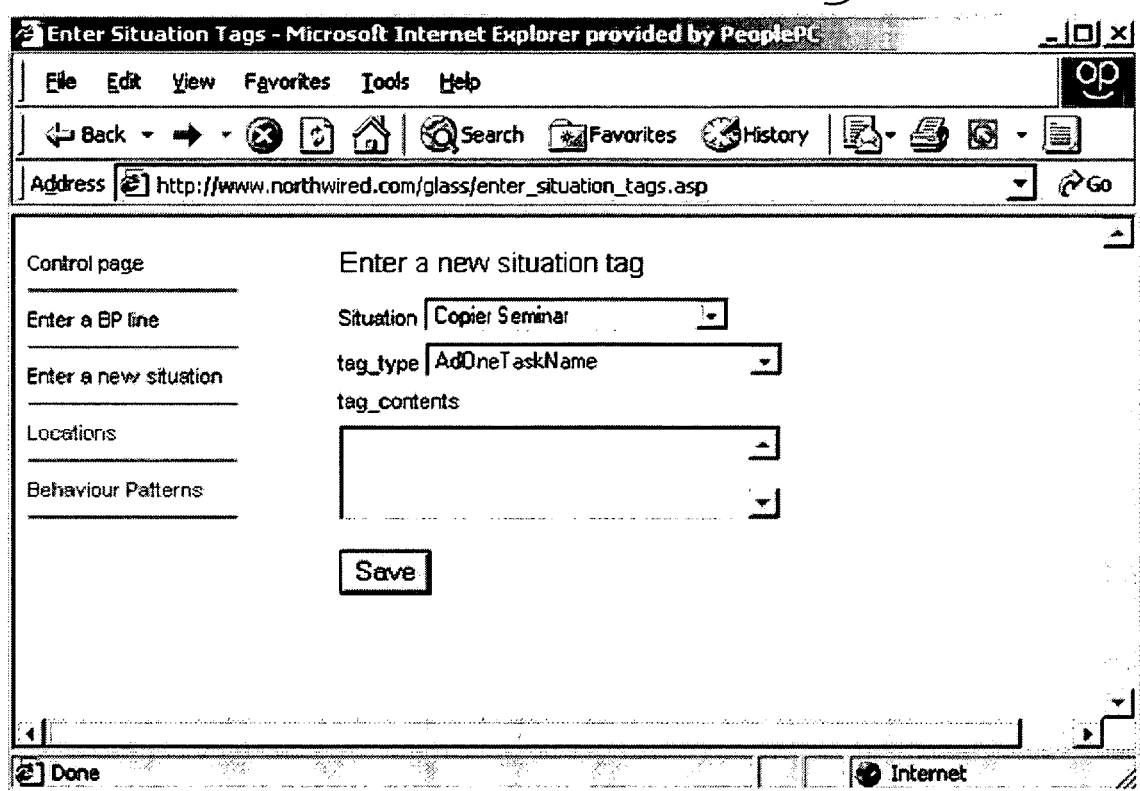
FIG. 15 illustrates an example window by which the system administrator can create new situation tags.

FIG. 15 illustrates an example window 104 presented by gaming engine 14 by which the system administrator can create new situation tags for assembling situation-specific content. For example, the system administrator may define a new situation tag "AdOneTaskName" for the situation "Copier Seminar."

Figure 16:
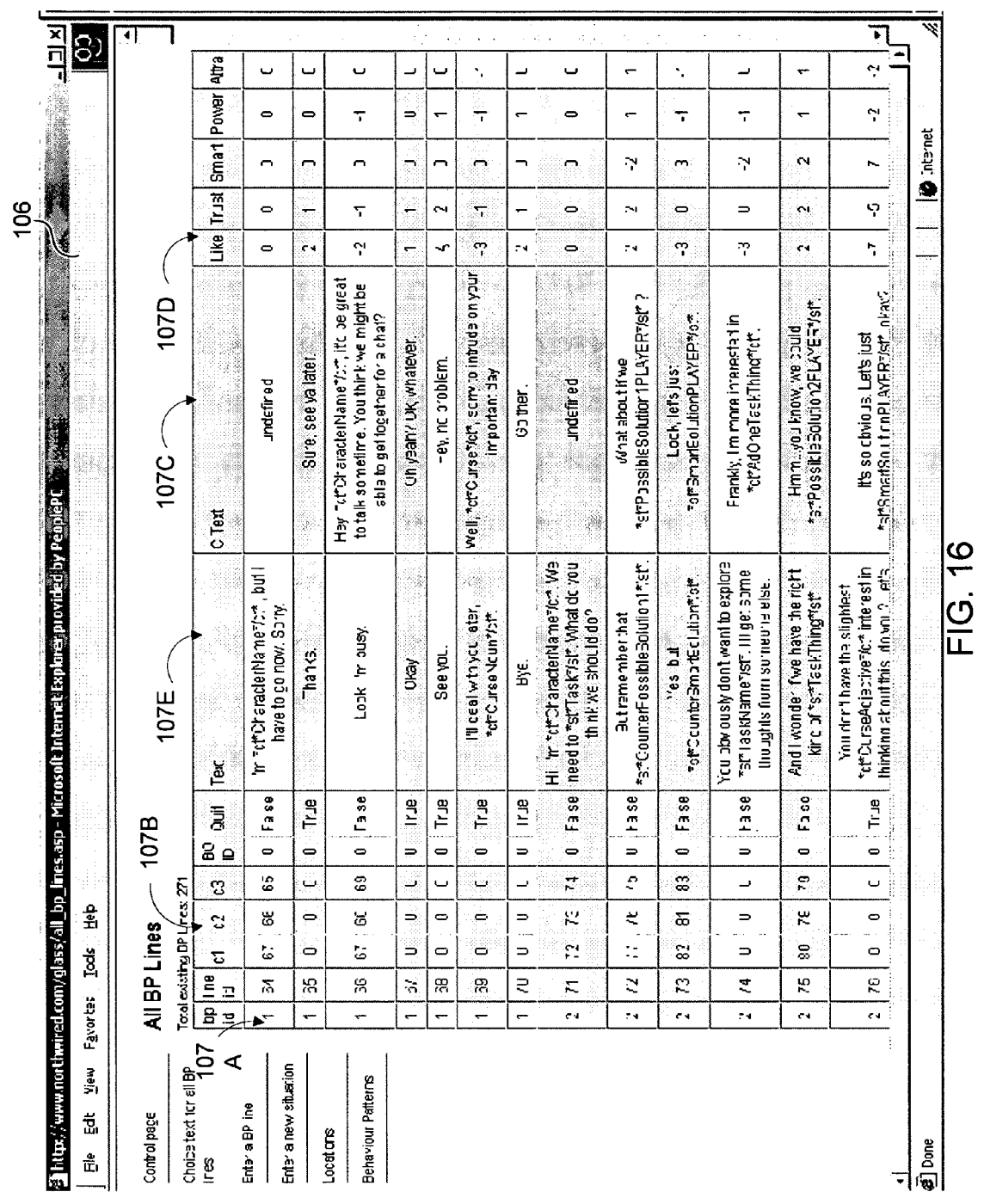

FIG. 16 illustrates an example window 106 presented by the user interface of gaming engine 14 for creating and managing the frames for the various behavior patterns. Window 106 presents all of the behavior pattern frames (lines) of the currently defined behavior patterns. For each behavior pattern frame, window 106 lists a corresponding behavior pattern identifier 107A to which the behavior pattern line is associated. Identifiers 107B list three possible choices (C1, C2, and C3) for user selection. The three choices 107B point to three destination behavior pattern lines from which to select media to present to the user as choices. Notably, the destination behavior pattern lines can be associated with different behavior patterns. Media 107E defines media to present to the user when the frame is the current frame of the behavior model. Presentation media 107C contains text-based dialogue for use when the behavior pattern frame is identified as a possible destination by a current behavior pattern frame. Modification values 107D define values with which to update the characters' relationship data upon reaching the particular behavior pattern frame.

Figure 17:
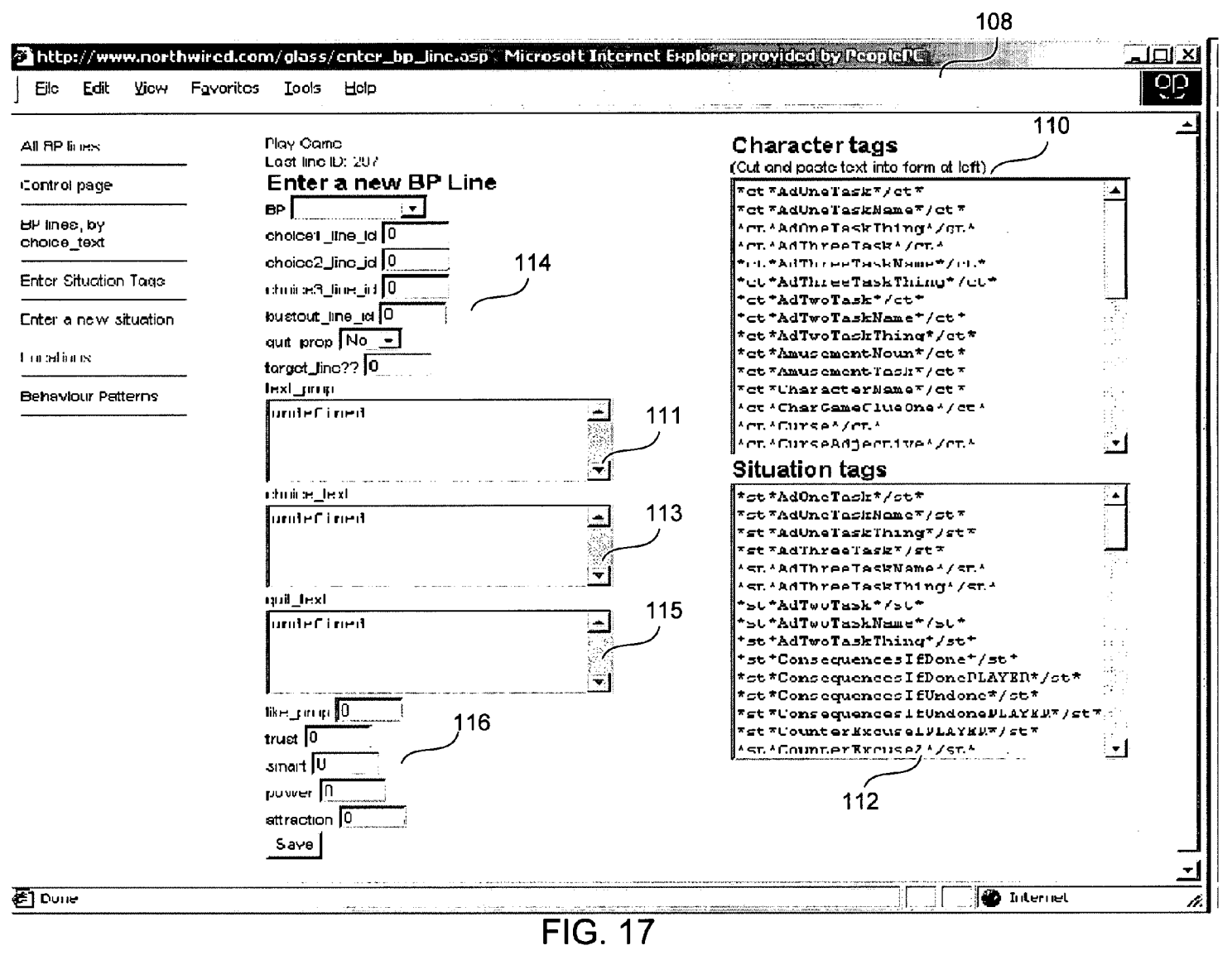

FIG. 17 further illustrates the process of defining a frame of a behavior pattern. By interacting with window 108, the system administrator can create new behavior pattern lines. For each new behavior pattern, the system administrator can define text 111 to display to the user when the new behavior pattern is involved in the current frame. In addition, the system administrator can define choice text 113 to display when the behavior pattern line is a destination frame identified by the current behavior pattern line. In order to assemble the various text boxes 111, 113 and 115, the system administrator can select character tags 110 and situation tags 112 and paste them into the corresponding input fields. Pointers 114 can be set to point at up to three possible destination frames. In addition, the system administrator can define modification values 116 for updating the characters relationship skill variables when the user reaches the new behavior pattern.

Figure 18:
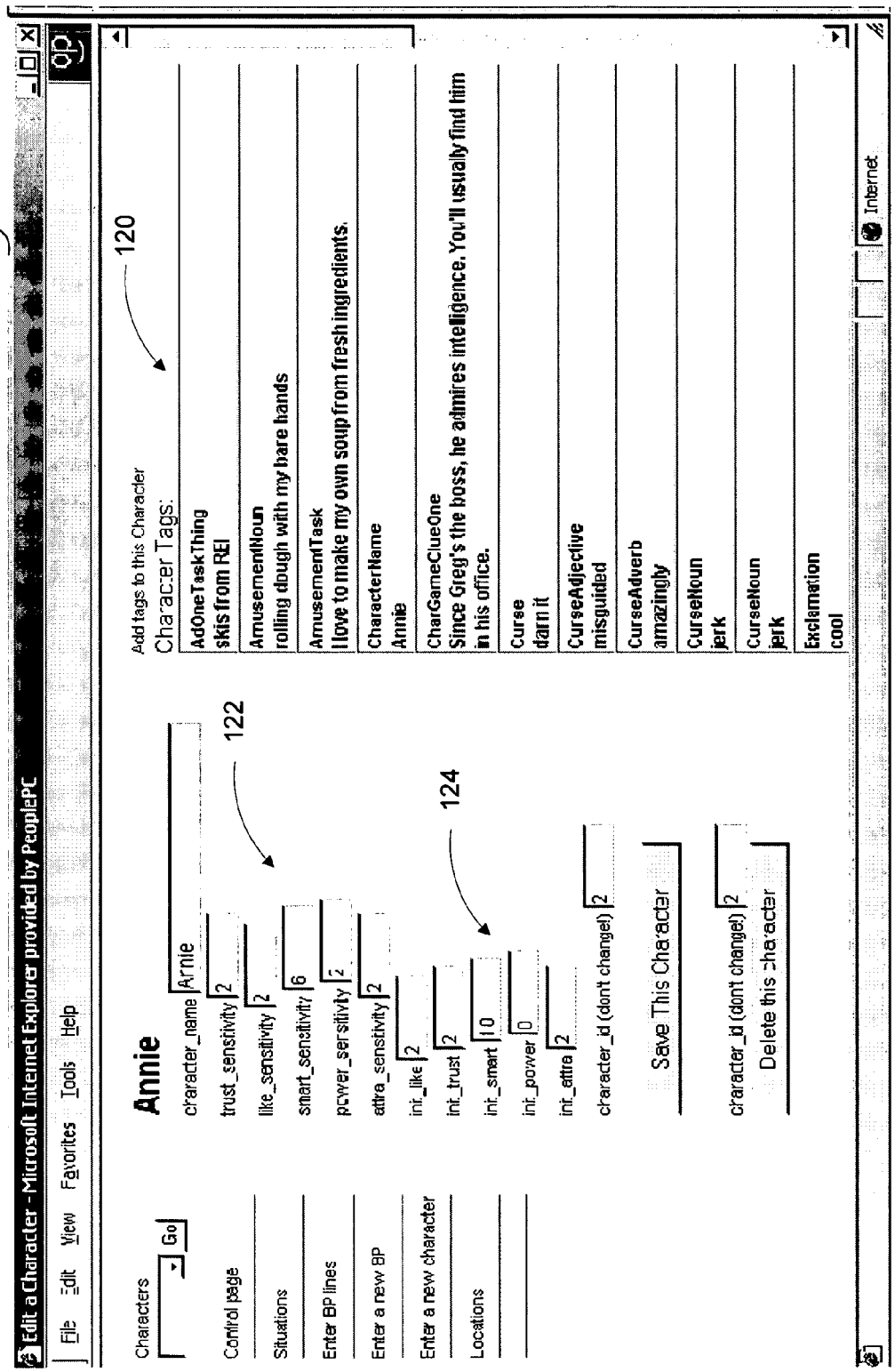
FIG. 18 illustrates an example window for creating a new character.

FIG. 18 illustrates an example window 118 for creating a new character record within character table 26. By interacting with window 118, the system administrator can define a number of character tags 120 for selection and incorporation by gaming engine 14 in order to generate dialogue and other content for gaming environment 6. The system administrator can define a number of sensitivity values 122 used as multipliers when modifying the corresponding relationship skill variables. Furthermore, the system administrator can define a set of initial values 124 for initializing the relationship skill variables, thereby reflecting any predisposition of the character.

Figure 19:
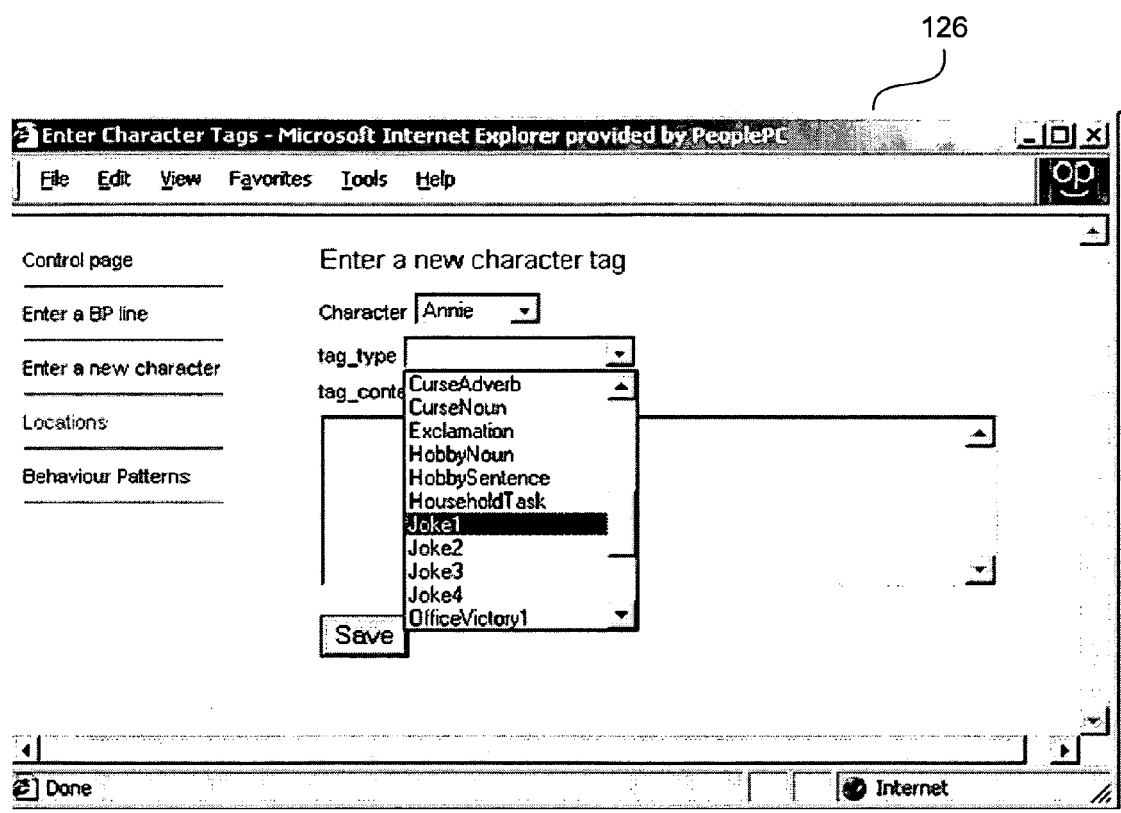
FIG. 19 illustrates an example window presented by which the system administrator can create new character tags.

FIG. 19 illustrates an example window 126 represented by gaming engine 14 by which the system administrator can create new character tags for the various characters of gaming environment 6. For example, as illustrated by window 126, the system administrator can associate media, such as dialogue-based text, with a character tag such as "Joke1." For each tag, the system administrator can define corresponding media such as text, video, audio or other media.

Figure 20:
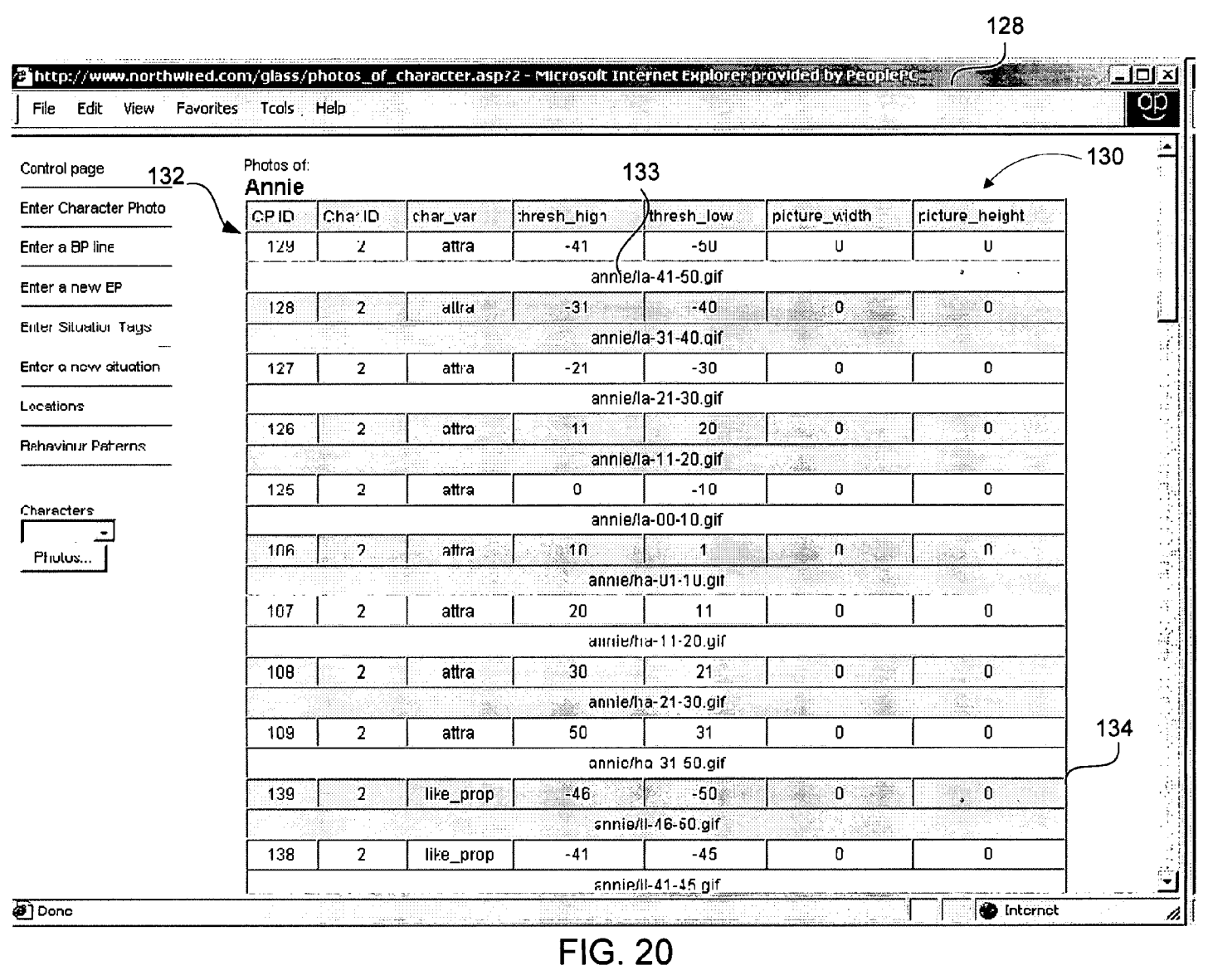

FIG. 20 illustrates an example window 128 represented by gaming engine 14, by which the system administrator can define and modify links to photographs stored within photograph repository 18 as referenced by character table 26 of database 16. For example, as illustrated in window 128, the character Annie has a number of photographs 130 associated with her. A first photograph 132 is valid when the attractiveness relationship skill variable is between the range of −41 to −50 and is associated with a particular image file 133 stored within photograph repository 18. Similarly, photograph 134 is valid when the likeability relationship skill variable for Annie falls within the range of −46 to −50.

Figure 21:
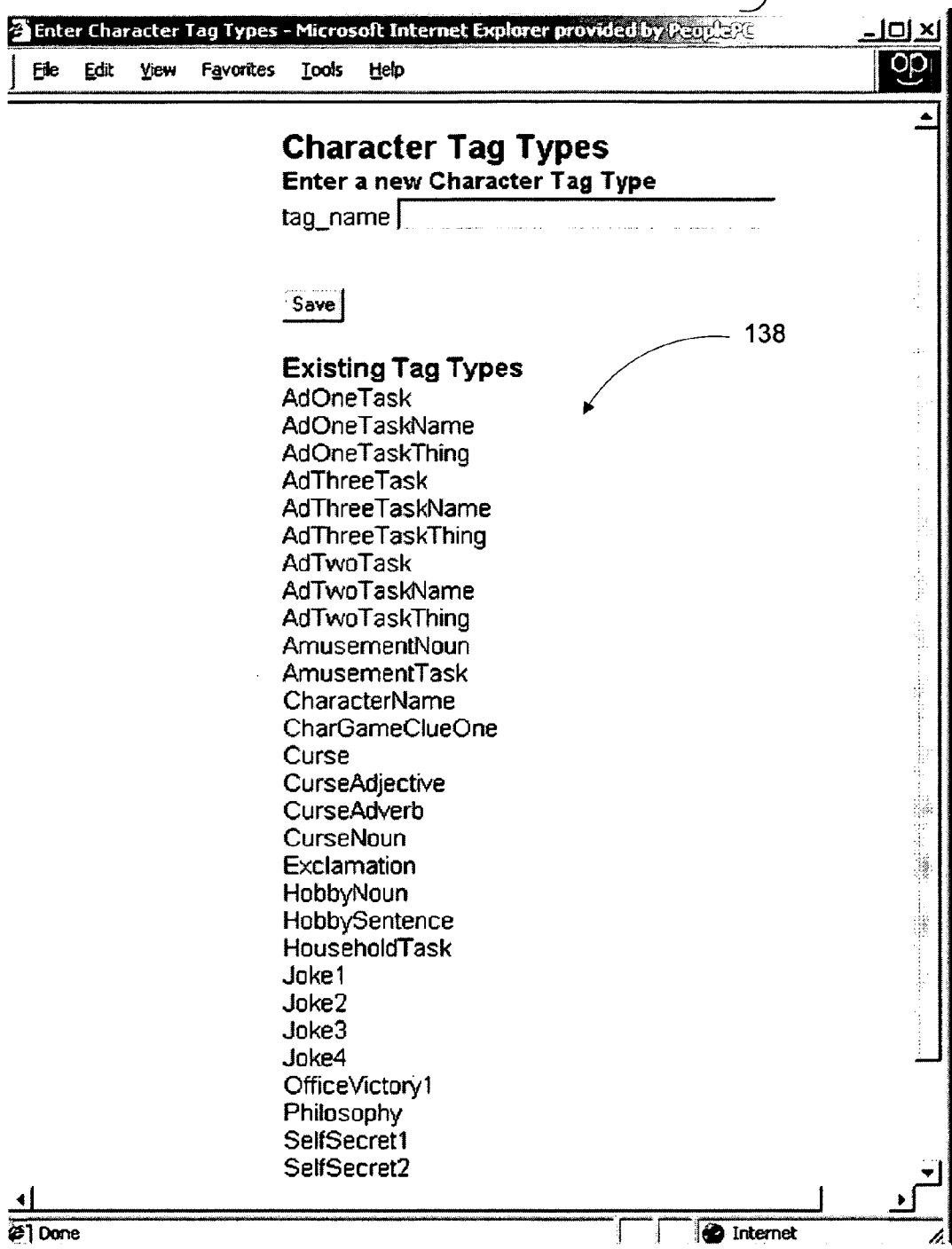
FIG. 21 illustrates an example window for creating and modifying character tag types.

FIG. 21 illustrates an example window 136 presented by gaming engine 14 by which the system administrator can create and modify character tag types. For example, window 136 lists a number of current character tag types 138 for use when creating character tags. Each character can, therefore, have character tags of the various character tag types. For example, in the illustrated embodiment, a character can have character tags of type Joke 1, Joke 2, Joke3 and Joke 4.

Figure 22:
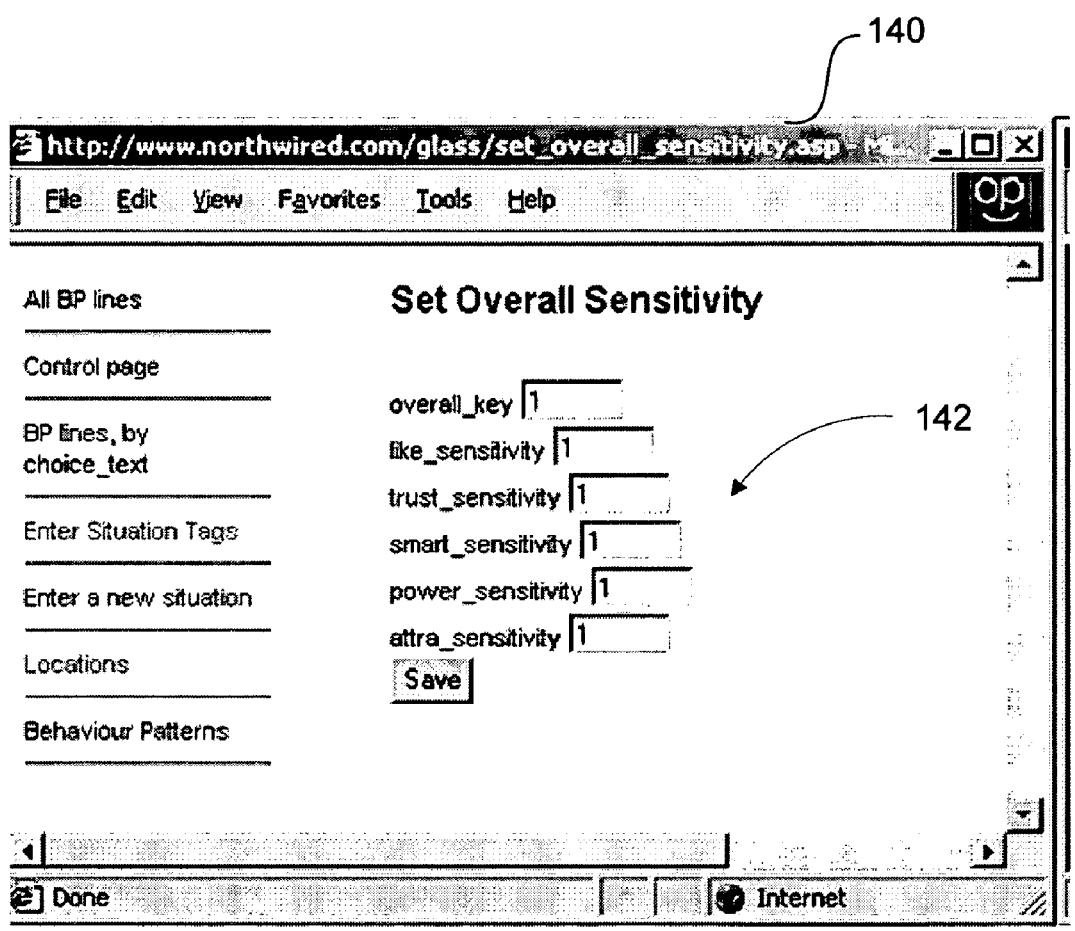
FIG. 22 illustrates an example window of the user interface for setting the game sensitivity.

FIG. 22 illustrates an example window 140 for setting a sensitivity for gaming engine 14. By adjusting sensitivity values 142, the system administrator can effectively increase or decrease the speed at which the player navigates the gaming environment. As described above, sensitivity values 142 can be used as multipliers when updating the relationship skill variables maintained by the various characters for interaction with the player.

A number of embodiments of the invention have been described. Nevertheless, it will be understood that various modifications may be made without departing from the spirit and scope of the invention. Accordingly, these and other embodiments are within the scope of the following claims.

The invention claimed is:

1. A method for modeling a two-way conversation between a computer-based character and a user, the method comprising:
   storing situation data that defines a set of situation tags and associated situation text, wherein the situation tags represent situations that describe contexts in which the user interacts with one or more of a plurality of characters;
   wherein a system administrator manages a situation tag type for assembling situation-specific content, and,
   wherein said system administrator creates said situation tags for assembling said situation-specific content, and,
   wherein said situation tags can be incorporated with contextual accuracy into multiple behavior patterns, and
   whereby said incorporation of said situation tags into said behavior patterns reduces the production costs of generating said contextually-accurate two-way conversations,
   storing character data that defines a set of character tags and associated character text for each of the plurality of computer-based characters;
   wherein said system administrator defines a character tag type for assembling character-specific content, and,
   wherein said system administrator creates said character tags for assembling said character-specific content, and,
   wherein said character tags can be incorporated with contextual accuracy into multiple behavior patterns, and
   whereby said incorporation of said character tags into said behavior patterns reduces the production costs of generating said contextually-accurate two-way conversations,
   storing a plurality of behavior patterns,
      wherein each of the behavior patterns defines a conversation with the user, wherein each of the behavior patterns defines the conversation as a series of interactions with the user in accordance with a consistent attitude, and wherein each of the behavior patterns can be used with the different characters and the different situations, and wherein each of the behavior patterns is represented as a set of linked frames that specify respective text-based dialogue to be presented to user; and wherein said system administrator creates said behavior patterns using the text associated with said situation tags and said character tags, and wherein said situation tags and said character tags can be incorporated with contextual accuracy into the behavior patterns, and whereby said insertion of said situation tags and said character tags into said behavior patterns reduces the production costs of generating said contextually-accurate two-way conversations, selecting one of the situations as a currently selected situation, one of the characters as a currently selected character, and one of the behavior patterns as a currently selected behavior pattern;

presenting text-based dialogue from the currently selected character to the user within the online environment by merging: (1) the text-based dialogue specified by the frames of the currently selected behavior pattern, (2) the situation text of the currently selected situation, and (3) the character text of the currently selected character.

2. The method of claim 1, wherein modeling the two-way conversation further comprises:

a system administrator managing a situation tag type for assembling situation-specific content (FIG. 11), and, said system administrator creating said situation tags for assembling said situation-specific content (FIG. 15), and said situation tags being able to be incorporated with contextual accuracy into multiple behavior patterns (FIG. 17), whereby said incorporation of said situation tags into said behavior patterns reduces the production costs of generating said contextually-accurate two-way conversations, and said system administrator defining a character tag type (FIG. 18) for assembling character-specific content, and, said system administrator creating said character tags for assembling said character-specific content (FIG. 19), and said character tags being able to be incorporated with contextual accuracy into multiple behavior patterns (FIG. 17), whereby said incorporation of said character tags into said behavior patterns reduces the production costs of generating said contextually-accurate two-way conversations, and said system administrator creating said behavior patterns using a minimal percentage of static text while incorporating a substantial percentage of the text associated with said situation tags and said character tags (FIG. 16), and said situation tags and said character tags being able to be incorporated with contextual accuracy into the behavior patterns (FIG. 17), whereby said insertion of said situation tags and said character tags into said behavior patterns reduces the production costs of generating said contextually-accurate two-way conversations.

3. The method of claim 1, wherein modeling the two-way conversation further comprises:

the computer communicating the text-based dialogue via other media for presentment to the user.

4. A computer-readable medium comprising instruction to cause a computer to model a two-way conversation between a computer-based character and a user by:

storing situation data that defines a set of situation tags and associated situation text, wherein the situation tags represent situations that describe contexts in which the user interacts with one or more of a plurality of the characters, wherein a system administrator manages a situation tag type for assembling situation-specific content, and, wherein said system administrator creates said situation tags for assembling said situation-specific content, and, wherein said situation tags can be incorporated with contextual accuracy into multiple behavior patterns, and whereby said incorporation of said situation tags into said behavior patterns reduces the production costs of generating said contextually-accurate two-way conversations, storing character data that defines a set of character tags and associated character text for each of the plurality of computer-based characters, wherein said system administrator defines a character tag type for assembling character-specific content, and, wherein said system administrator creates said character tags for assembling said character-specific content, and, wherein said character tags can be incorporated with contextual accuracy into multiple behavior patterns, and whereby said incorporation of said character tags into said behavior patterns reduces the production costs of generating said contextually-accurate two-way conversations, storing a plurality of behavior patterns, wherein each of the behavior patterns defines a conversation with the user, wherein each of the behavior patterns defines the conversation as a series of interactions with the user in accordance with a consistent attitude, and wherein each of the behavior patterns can be used with the different characters and the different situations, and wherein each of the behavior patterns is represented as a set of linked frames that specify respective text-based dialogue to be presented to the user; and wherein said system administrator creates said behavior patterns using the text associated with said situation tags and said character tags, and wherein said situation tags and said character tags can be incorporated with contextual accuracy into the behavior patterns, and whereby said insertion of said situation tags and said character tags into said behavior patterns reduces the production costs of generating said contextually-accurate two-way conversations, selecting one of the situations as a currently selected situation, one of the characters as a currently selected character, and one of the behavior patterns as a currently selected behavior pattern;

presenting text-based dialogue from the currently selected character to the user within the online environment by merging: (1) the text-based dialogue specified by the frames of the currently selected behavior pattern, (2)

the situation text of the currently selected situation, and (3) the character text of the currently selected character.

5. The computer-readable medium of claim 4 comprising instruction to cause a computer to model a two-way conversation between a computer-based character and a user wherein:

a system administrator manages a situation tag type for assembling situation-specific content (FIG. 11), and, said system administrator creates said situation tags for assembling said situation-specific content (FIG. 15), and said situation tags can be incorporated with contextual accuracy into multiple behavior patterns (FIG. 17), whereby said incorporation of said situation tags into said behavior patterns substantially the production costs of generating said contextually-accurate two-way conversations, and said system administrator defines a character tag type (FIG. 18) for assembling character-specific content, and, said system administrator creates said character tags for assembling said character-specific content (FIG. 19), and said character tags can be incorporated with contextual accuracy into multiple behavior patterns (FIG. 17), whereby said incorporation of said character tags into said behavior patterns reduces the production costs of generating said contextually-accurate two-way conversations, and said system administrator creates said behavior patterns using a minimal percentage of static text while incorporating a substantial percentage of the text associated with said situation tags and said character tags (FIG. 16), and said situation tags and said character tags can be incorporated with contextual accuracy into the behavior patterns (FIG. 17), whereby said insertion of said situation tags and said character tags into said behavior patterns, reduces the production costs of generating said contextually-accurate two-way conversations.

6. The computer-readable medium of claim 4, wherein modeling the two-way conversation further comprises:

the computer communicating the text-based dialogue via other media for presentment to the user.

7. A system comprising:

a database to store:

(a) situation data that defines a set of situation tags and associated situation text, wherein the situation tags represent situations that describe contexts in which the user interacts with one or more of a plurality of characters, wherein a system administrator manages a situation tag type for assembling situation-specific content, and, wherein said system administrator creates said situation tags for assembling said situation-specific content, and, wherein said situation tags can be incorporated with contextual accuracy into multiple behavior patterns, and whereby said incorporation of said situation tags into said behavior patterns reduces the production costs of generating said contextually-accurate two-way conversations, (b) character data that defines a set of character tags and associated character text for each of the plurality of computer-based characters, and wherein said system administrator defines a character tag type for assembling character-specific content, and, wherein said system administrator creates said character tags for assembling said character-specific content, and, wherein said character tags can be incorporated with contextual accuracy into multiple behavior patterns, and whereby said incorporation of said character tags into said behavior patterns reduces the production costs of generating said contextually-accurate two-way conversations, (c) a plurality of behavior patterns, wherein each of the behavior patterns defines a conversation with the user, wherein each of the behavior patterns defines the conversation as a series of interactions with the user in accordance with a consistent attitude, wherein each of the behavior patterns can be used with the different characters and the different situations, and wherein each of the behavior patterns is represented as a set of linked frames that specify respective text-based dialogue to be presented to the user;

wherein said system administrator creates said behavior patterns using the text associated with said situation tags and said character tags, and wherein said situation tags and said character tags can be incorporated with contextual accuracy into the behavior patterns, and whereby said insertion of said situation tags and said character tags into said behavior patterns reduces the production costs of generating said contextually-accurate two-way conversations, a computer coupled to the database; and a software engine executing on the computer, wherein the software engine models a two-way conversation by:

selecting one of the situations as a currently selected situation, one of the characters as a currently selected character, and one of the behavior patterns as a currently selected behavior pattern;

presenting text-based dialogue from the currently selected character to the user within the online environment by merging: (1) the text-based dialogue specified by the frames of the currently selected behavior pattern, (2) the situation text of the currently selected situation, and (3) the character text of the currently selected character.

8. The system of claim 7 wherein:

a system administrator manages a situation tag type for assembling situation-specific content (FIG. 11), and, said system administrator creates said situation tags for assembling said situation-specific content (FIG. 15), and said situation tags can be incorporated with contextual accuracy into multiple behavior patterns (FIG. 17), whereby said incorporation of said situation tags into said behavior patterns reduces the production costs of generating said contextually-accurate two-way conversations, and said system administrator defines a character tag type (FIG. 18) for assembling character-specific content, and, said system administrator creates said character tags for assembling said character-specific content (FIG. 19), and said character tags can be incorporated with contextual accuracy into multiple behavior patterns (FIG. 17), whereby said incorporation of said character tags into said behavior patterns reduces the production costs of generating said contextually-accurate two-way conversations, and said system administrator creates said behavior patterns using a minimal percentage of static text while incorporating a substantial percentage of the text associated with said situation tags and said character tags (FIG. 16), and said situation tags and said character tags can be incorporated with contextual accuracy into the behavior patterns (FIG. 17), whereby said insertion of said situation tags and said character tags into said behavior patterns reduces the production costs of generating said contextually-accurate two-way conversations.

9. The system of claim 7, wherein modeling the two-way conversation further comprises:

the computer communicating the text-based dialogue via other media for presentment to the user.

* * * * *